(12) United States Patent
Oketani

(10) Patent No.: US 10,257,818 B2
(45) Date of Patent: Apr. 9, 2019

(54) METHOD AND APPARATUS FOR PROCESSING DOWNLINK HARQ PROCESS IN CARRIER AGGREGATION

(71) Applicant: NEC Corporation, Tokyo (JP)

(72) Inventor: Kengo Oketani, Tokyo (JP)

(73) Assignee: NEC Corporation, Tokyo (JP)

( * ) Notice: Subject to any disclaimer, the term of this patent is extended or adjusted under 35 U.S.C. 154(b) by 53 days.

(21) Appl. No.: 15/329,858

(22) PCT Filed: Apr. 17, 2015

(86) PCT No.: PCT/JP2015/002116
§ 371 (c)(1),
(2) Date: Jan. 27, 2017

(87) PCT Pub. No.: WO2016/017052
PCT Pub. Date: Feb. 4, 2016

(65) Prior Publication Data
US 2017/0257849 A1 Sep. 7, 2017

(30) Foreign Application Priority Data
Jul. 29, 2014 (JP) .................................. 2014-154035

(51) Int. Cl.
*H04W 72/04* (2009.01)
*H04L 5/00* (2006.01)
(Continued)

(52) U.S. Cl.
CPC ......... *H04W 72/042* (2013.01); *H04L 1/1812* (2013.01); *H04L 1/1822* (2013.01);
(Continued)

(58) Field of Classification Search
CPC ... H04B 1/56; H04B 7/2656; H04W 72/0446; H04W 88/08; H04W 76/02
See application file for complete search history.

(56) References Cited

U.S. PATENT DOCUMENTS 8,879,506 B1 * 11/2014 Singh ................ H04W 36/0016
370/331
9,480,048 B2 * 10/2016 Earnshaw ................. H04L 1/02
(Continued)

OTHER PUBLICATIONS

International Search Report corresponding to PCT/JP2015/002116, dated Jul. 7, 2015 (5 pages).
(Continued)

*Primary Examiner* — Gbemileke J Onamuti
*Assistant Examiner* — Sanjay K Dewan
(74) *Attorney, Agent, or Firm* — Wilmer Cutler Pickering Hale and Dorr LLP

(57) ABSTRACT

A radio terminal (1) determines a maximum number of HARQ processes used for DL transport blocks received in an FDD serving cell (32) based on whether or not the radio terminal (1) is configured to monitor a downlink (DL) control channel of a TDD serving cell (31) for scheduling the FDD serving cell (32). This contributes, for example, to appropriate determination of a maximum number of HARQ processes used for DL transport blocks transmitted in the FDD serving cell when FDD-TDD carrier aggregation (FDD-TDD CA) is configured and when cross-carrier scheduling is configured for DL transmission in the FDD serving cell.

9 Claims, 17 Drawing Sheets

(51) Int. Cl.
H04L 5/14      (2006.01)
H04L 1/18      (2006.01)
H04W 28/04     (2009.01)
H04W 76/27     (2018.01)
H04W 88/02     (2009.01)
H04W 88/08     (2009.01)

(52) U.S. Cl.
CPC ............ *H04L 1/1896* (2013.01); *H04L 5/001* (2013.01); *H04L 5/0055* (2013.01); *H04L 5/14* (2013.01); *H04L 5/1469* (2013.01); *H04W 28/04* (2013.01); *H04W 72/0446* (2013.01); *H04W 76/27* (2018.02); *H04L 1/1835* (2013.01); *H04W 88/02* (2013.01); *H04W 88/08* (2013.01)

(56) References Cited

U.S. PATENT DOCUMENTS

| | | | |
|---|---|---|---|
| 9,602,253 B2* | 3/2017 | Seo | H04L 1/1861 |
| 2007/0189231 A1* | 8/2007 | Chang | H04L 1/1819 370/335 |
| 2009/0041110 A1* | 2/2009 | Malladi | H03M 13/2957 375/240 |
| 2009/0049359 A1* | 2/2009 | Malladi | H04L 1/0013 714/752 |
| 2012/0057529 A1 | 3/2012 | Seo et al. | |
| 2012/0188952 A1* | 7/2012 | Baldemair | H04L 1/1822 370/329 |
| 2012/0275397 A1 | 11/2012 | Hsieh et al. | |
| 2013/0176981 A1 | 7/2013 | Earnshaw et al. | |
| 2013/0343239 A1 | 12/2013 | Damnjanovic et al. | |
| 2014/0204811 A1* | 7/2014 | Lu | H04L 1/1861 370/280 |
| 2015/0181590 A1* | 6/2015 | Park | H04L 1/1812 370/280 |
| 2016/0088635 A1* | 3/2016 | Davydov | H04L 1/1812 370/329 |
| 2017/0171739 A1* | 6/2017 | Suzuki | H04W 8/24 |
| 2017/0222763 A1* | 8/2017 | Lee | H04L 1/1812 |

OTHER PUBLICATIONS

3GPP TS 36.306 V12.1.0 (Jun. 2014) "3rd Generation Partnership Project; Technical Specification Group Radio Access Network; Evolved Universal Terrestrial Radio Access (E-UTRA); User Equipment (UE) Radio Access Capabilities (Release 12)," Jun. 2014, pp. 1-30.
3GPP TS 36.212 V12.1.0 (Jun. 2014) "3rd Generation Partnership Project; Technical Specification Group Radio Access Network; Evolved Universal Terrestrial Radio Access (E-UTRA); Multiplexing and Channel Coding (Release 12)," Jun. 2014, pp. 1-89.
3GPP TS 36.213 V12.2.0 (Jun. 2014) "3rd Generation Partnership Project; Technical Specification Group Radio Access Network; Evolved Universal Terrestrial Radio Access (E-UTRA); Physical Layer Procedures (Release 12)," Jun. 2014, pp. 1-207.
LG Electronics, "Remaining RAN1 Specification Details for TDD-FDD CA," 3GPP TSG-RAN WG1#76b, R1-141336, Internet <URL:http://www.3gpp.org/ftp/tsg_ran/WG1_RL1/TSGR_76b/Docs/R1-141336.zip>, Apr. 4, 2014, (6 pages).
TSG RAN WG1, "CRs to 36.211, 36.212 and 36.213 for Inclusion of Rel-12 Features," [online], 3GPP TSG-RAN#64, RP-140862, pp. 6-8, Internet <URL:http://www.3gpp.org/ftp/tsg_ran/TSG_RAN/TSGR_64/DocsRP-140862.zip>, Jun. 13, 2014, (4 pages).
CATT, "PDSCH Timing With TDD as PCell for FDD-TDD CA" [online], 3GPP TSG-RAN WG1#75, R1-135072, Internet <URL:http://www.3gpp.org/ftp/tsg_ran/WG1_RL1/TSGR1_75/Docs/R1-135072.zip>, Nov. 15, 2013 (4 pages).
Renesas Mobile Europe Ltd., "Remaining Issues for Soft Buffer Handling for CC Specific TDD Configuration," [online], 3GPP TSG-RAN WG1#71 R1-125046, Internet <URL:http://www.3gpp.org/ftp/tsg_ran/WG1_RL1/TSGR_71/Docs/R1-125046.zip>, Nov. 16, 2012 (4 pages).
Huawei, HiSilicon, "Clarification on Determination on Soft Buffer Size," [online], 3GPP TSG-RAN WG1#77 R1-142766, Internet <URL:http://www.3gpp.org/ftp/tsg_ran/WG1_RL1/TSGR1_77/Docs/R1-142766.zip>, May 23, 2014 (3 pages).

* cited by examiner

Fig. 2

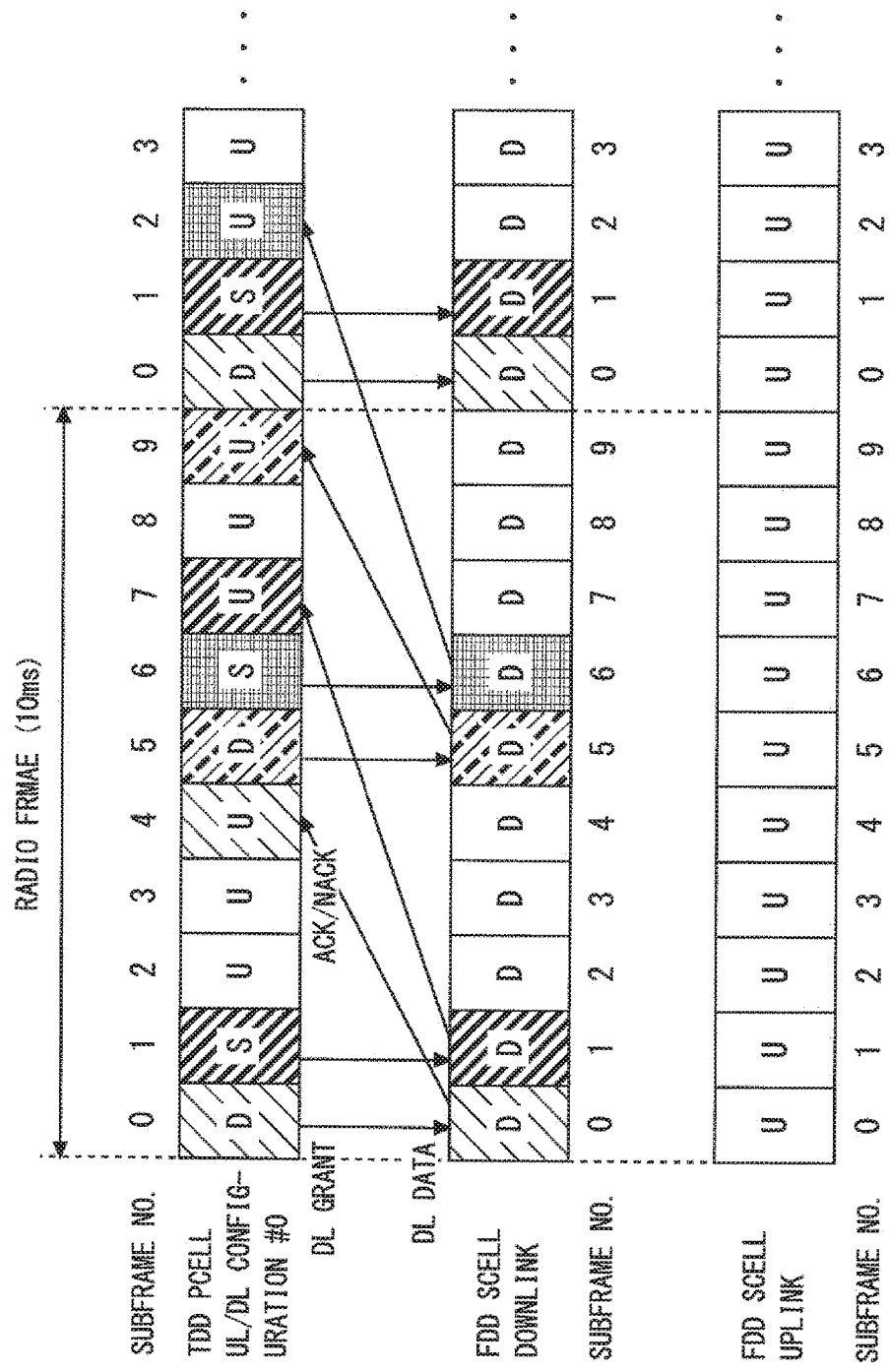

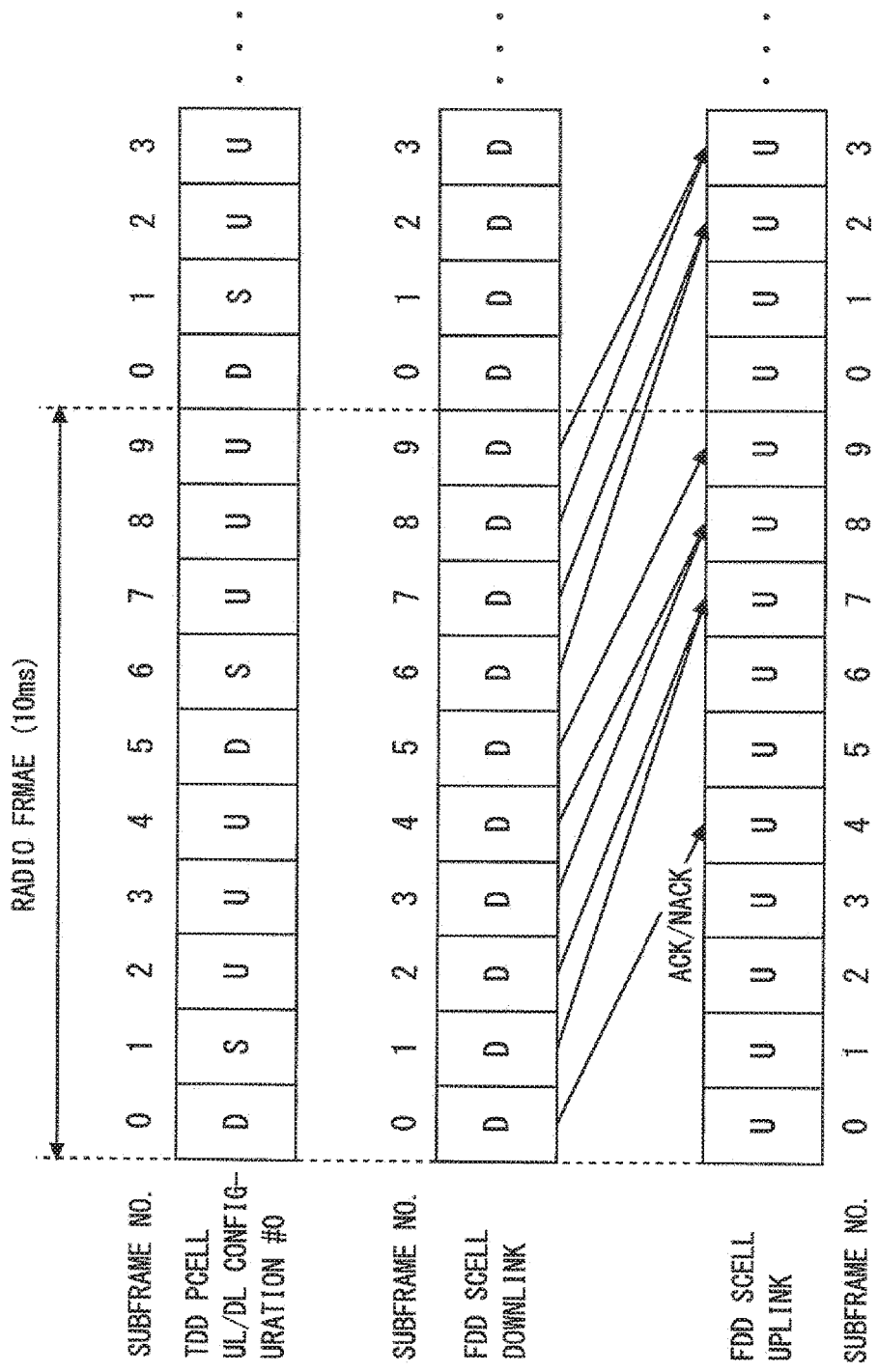

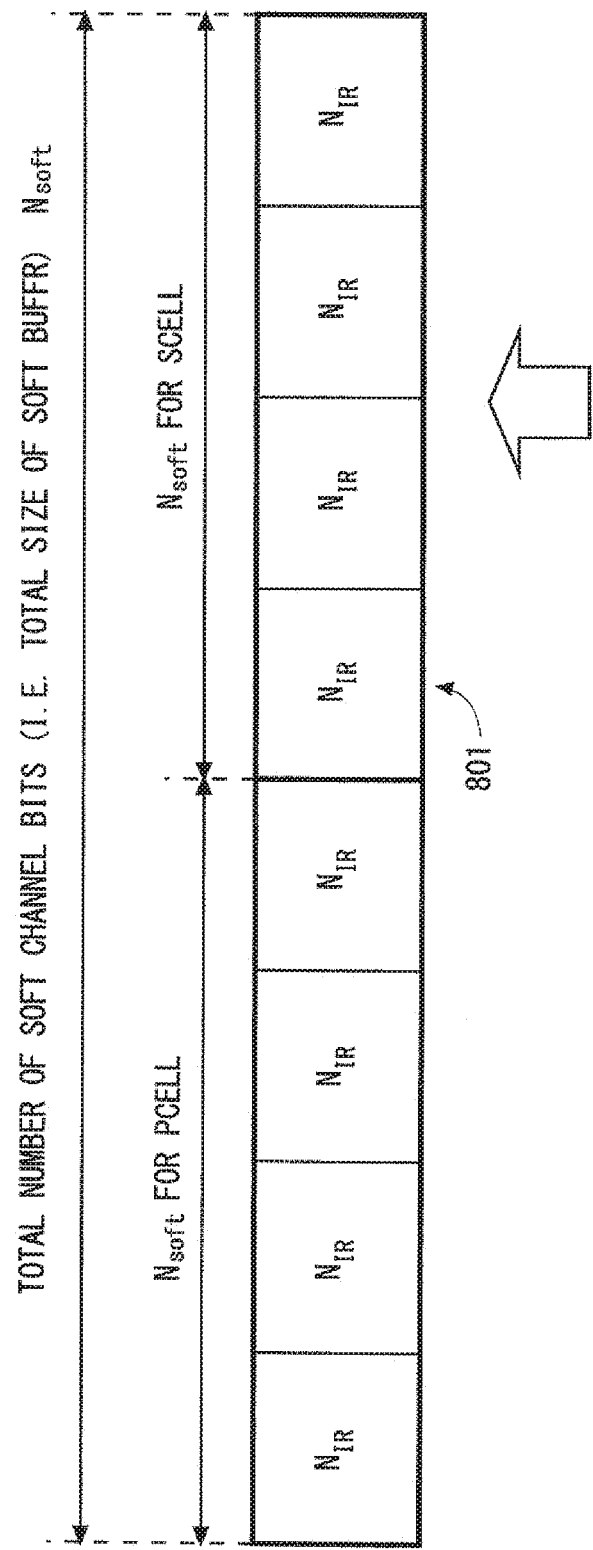

METHOD AND APPARATUS FOR PROCESSING DOWNLINK HARQ PROCESS IN CARRIER AGGREGATION

CROSS-REFERENCE TO RELATED APPLICATIONS

This application is a national stage application of International Application No. PCT/JP2015/002116 entitled "METHOD AND APPARATUS FOR PROCESSING DOWNLINK HARQ PROCESS IN CARRIER AGGREGATION," filed on Apr. 17, 2015, which claims the benefit of the priority of Japanese Patent Application No. 2014-154035, filed on Jul. 29, 2014, the disclosures of each of which are hereby incorporated by reference in their entirety.

TECHNICAL FIELD

The present disclosure relates to a radio communication system, and more particularly, to a method and apparatus for processing downlink hybrid automatic repeat request (HARQ) processes in carrier aggregation.

BACKGROUND ART

Radio frame structures and HARQ in a physical downlink used for 3rd Generation Partnership Project (3GPP) Release 8 (referred to as Long Term Evolution (LTE)) and beyond will be described below. Next, carrier aggregation (CA), which has been newly introduced in 3GPP Release 10 (referred to as LTE-Advanced), and its scheduling will be described. Furthermore, a TDD-FDD carrier aggregation which has been newly introduced in 3GPP Release 12 (referred to as LTE-B) will be described.

First, LTE radio frame structures will be described. In 3GPP Release 8 and beyond (i.e., LTE), two types of radio frame structures are specified. One is referred to as a frame structure type 1, which is applied to frequency division duplex (FDD). The other one is referred to as a frame structure type 2, which is applied to time division duplex (TDD). As shown in FIG. 1, in the frame structure type 1 and type 2, the length of one radio frame is 10 milliseconds, and one radio frame is composed of 10 subframes. In the case of TDD, the first 5 subframes (#0 to #4) and the latter 5 subframes (#5 to #9) are each referred to as a half frame. The length of a half frame is 5 milliseconds. The length of one subframe is 1 millisecond. One subframe is divided into two slots each having a length of 0.5 milliseconds. In the case of a normal cyclic prefix, one slot includes seven symbols (i.e., single carrier frequency division multiple access (SC-FDMA) symbols in an uplink, and orthogonal frequency division multiplexing (OFDM) symbols in a downlink) in the time domain. Thus, one subframe includes 14 symbols in the time domain.

Figure 2:
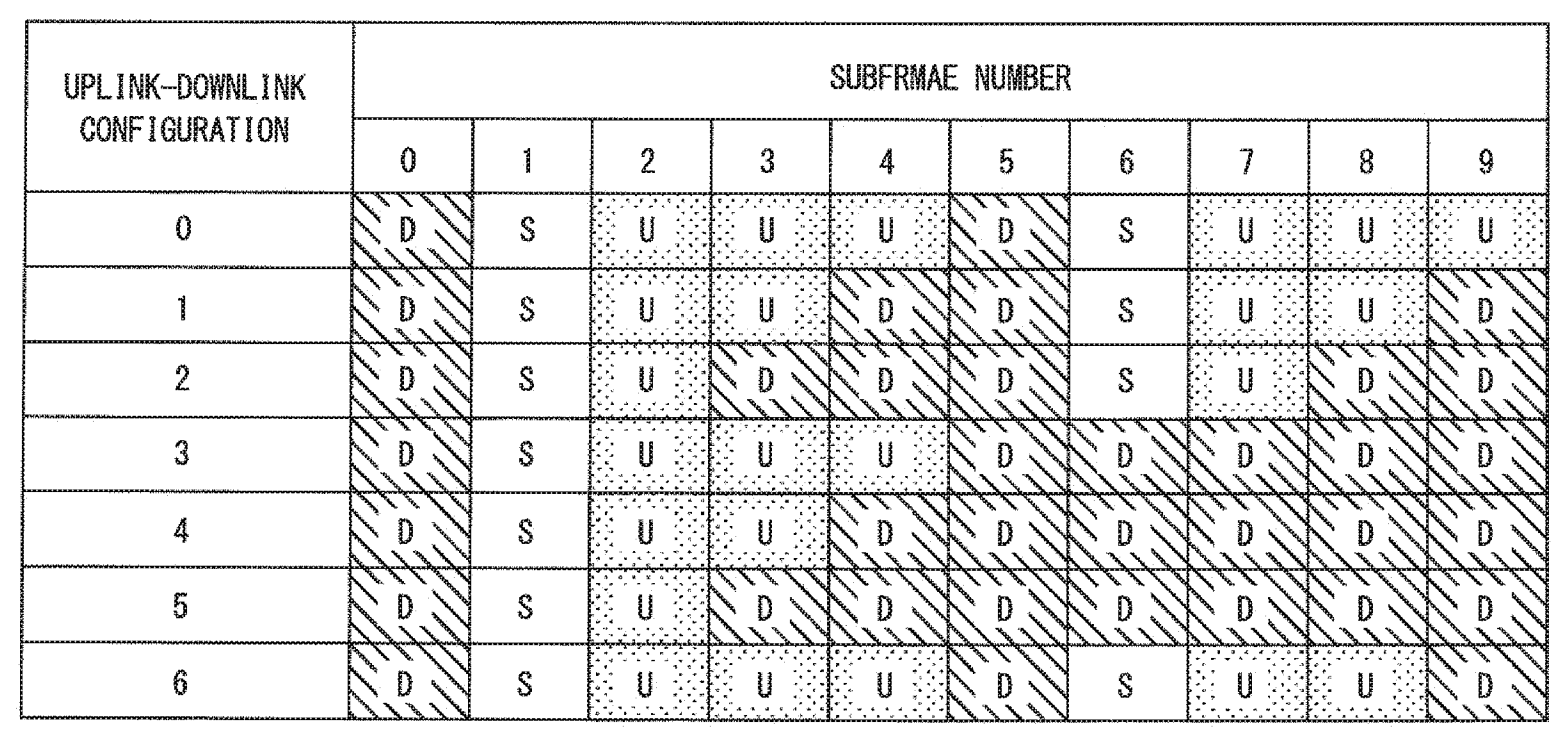

FIG. 2 shows seven uplink/downlink configurations (TDD UL/DL configurations) supported by TDD LTE. In the case of TDD LTE, uplink subframes (UL subframes) and downlink subframes (DL subframes) coexist in one radio frame. The TDD UL/DL configuration indicates the arrangement of uplink and downlink subframes in one radio frame. In FIG. 2, "D" represents a DL subframe; "U" represents a UL subframe; and "S" represents a special subframe. The TDD LTE repeatedly uses any one of the TDD UL/DL configurations shown in FIG. 2 in the period of the radio frame (i.e., 10 milliseconds).

The UL subframe is a subframe in which uplink (UL) transmission from a radio terminal (user equipment (UE)) to a base station (eNodeB (eNB)) is performed. The DL subframe is a subframe in which downlink (DL) transmission from a base station to a radio terminal is performed. Switching from DL transmission (DL subframe) to UL transmission (UL subframe) is performed at the second subframe (i.e., subframe #1 or #6) in the half frame. FIG. 3 shows a configuration example of the special subframe. The special subframe is composed of a downlink pilot time slot (DwPTS) in which DL transmission is performed, a guard period (GP) in which no transmission is performed, and an uplink pilot time slot (UpPTS) in which uplink transmission is performed.

Subsequently, the data transmission process in a physical downlink shared channel (PDSCH), including HARQ operation, will be described. In the 3GPP Release 8 and beyond, downlink user data is transmitted on the PDSCH. Meanwhile, control information about downlink communication is transmitted on a physical downlink control channel (PDCCH). The control information about downlink communication includes a downlink (DL) grant indicating allocation of PDSCH resources to the radio terminal. In response to decoding the PDCCH indicating the DL grant, the radio terminal receives downlink data on the PDSCH, checks if there is a cyclic redundancy check (CRC) error in the downlink data, and transmits a CRC result (i.e., acknowledgement (ACK) or negative ACK (NACK)) on a physical uplink control channel (PUCCH) or a physical uplink shared channel (PUSCH).

Upon receiving an ACK, the base station transmits next new data to the radio terminal. Upon receiving a NACK, the base station performs retransmission of the data that has previously been transmitted. Note that the 3GPP Release 8 and beyond supports incremental redundancy (IR) HARQ, and accordingly data to be retransmitted includes additional parity bits different from those in the first transmitted data, which includes systematic bits and some parity bits obtained by turbo coding. Specifically, the base station manages a circular buffer (CB) that stores a code block obtained by performing turbo coding, subblock interleaving and bit collection, and the base station selects an offset (i.e., redundancy version (RV)=0) corresponding to the beginning of the CB for the initial transmission to send the systematic bits. The RV specifies a starting point in the CB to start reading out bits from the CB for transmission. In retransmission, the base station selects a different RV from that used in the initial transmission to perform incremental redundancy (IR) and thus sends additional parity bits which are not included in the initial transmission.

As is well known, the HARQ is a scheme in which forward error correction coding, such as turbo coding, is combined with a primitive ARQ scheme. That is, in the HARQ, user data and CRC bits are protected by error correcting code (ECC). The addition of the error correcting code increases the redundancy and thereby increase the transmission success probability in the HARQ, but it decreases the percentage of the user data within the data to be transmitted (i.e., causes decrease in coding rate). For this reason, the 3GPP Release 8 and beyond supports the incremental redundancy (IR) HARQ, and bit selection and puncturing are performed on the coded code block data stored in the circular buffer during the rate matching process for transmission.

The media access control (MAC) layer in the 3GPP Release 8 and beyond employs the stop-and-wait (SAW) HARQ. Specifically, in the DL transmission, the base station transmits one downlink transport block, and then stops further transmission and waits until a feedback (i.e., ACK or NACK) is received from the radio terminal. Upon receiving an ACK from the radio terminal, the base station transmits a new downlink transport block. Upon receiving a NACK from the radio terminal (or a predetermined period has passed without receiving any feedback), the base station re-transmits the transport block. Such a simple SAW operation reduces the transmission efficiency, which makes it difficult to use the transmission resources (DL radio frames) efficiently. Therefore, the multi-process HARQ is used. In the multi-process HARQ, independent HARQ processes are interlaced in time so that all transmission resources can be efficiently used. Each HARQ process is responsible for a separate SAW operation and uses a separate partition in a soft buffer as described later.

FIG. 4 shows one HARQ process in the downlink in the FDD operation. In the example of FIG. 4, in the subframe #0, the base station transmits a DL grant on the PDCCH and transmits DL data on the PDSCH. The radio terminal receives the DL data on the PDSCH in the subframe #0, decodes the transport block from the DL data, and performs CRC test on the transport block. Further, the radio terminal transmits the CRC result (ACK or NACK) for the transport block, which was transmitted in the subframe #0, on the PDCCH or PUSCH of the subframe #4. The delay time (T_UL_ACK) from the DL data transmission to the ACK/NACK transmission is specified to be four subframes (4 milliseconds).

The base station receives the ACK/NACK from the radio terminal in the subframe #4, and performs re-transmission (in the case of NACK) or transmission of a new transport block (in the case of ACK) in the subframe #m. Note that in the downlink of the 3GPP Release 8 and beyond, asynchronous (asynchronous) HARQ is employed and the retransmission or the subsequent transmission can occur at any time after the initial transmission, and thus the delay time (T_eNB_processing) from the ACK/NACK transmission to the subsequent transmission or retransmission depends on the processing time of the base station. However, it is assumed that the typical length of T_eNB_processing is four subframes (4 milliseconds). Accordingly, in the case of FDD, the typical downlink HARQ round trip time (RTT) is eight subframes (8 milliseconds). Therefore, the 3GPP Release 8 and beyond specifies that the maximum number ($M_{DL\_HARQ}$) of downlink HARQ processes in the FDD operation is 8. As shown in FIG. 4, the HARQ RTT indicates the interval (i.e., T_UL_ACK+T_eNB_processing) from the initial transmission of the DL transport block to the subsequent transmission or retransmission in one HARQ process (SAW operation). FIG. 5 shows a case where eight HARQ processes are used in parallel in the case of FDD. The eight HARQ processes are interlaced in time and operated in accordance with the HARQ RTT of eight subframes.

As described above, in the FDD operation, HARQ-ACK/NACK transmitted in a certain UL subframe #n indicates the CRC result of transmitted data in a DL subframe #(n-4) which is located four subframes in advance. In other words, in the case of FDD operation, the UL subframe for HARQ-ACK/NACK is mapped on a one-to-one basis with the DL subframe which is located four subframes in advance. However, in the case of TDD operation, as is clear from the TDD UL/DL configurations shown in FIG. 2, an UL subframe is not always located four frames after a DL subframe (or a special subframe in which DL transmission can be performed). Further, the arrangement of DL subframes and UL subframes varies depending on the TDD UL/DL configuration. Accordingly, only one type of relationship between the UL subframes and the DL subframes in the FDD operation cannot be applied to the TDD operation. Therefore, each TDD UL/DL configuration has its unique mapping between the UL subframes and the DL subframes for HARQ-ACK/NACK. Further, the HARQ RTT in the TDD operation is generally longer than that in the FDD operation.

Table 1 shows mapping between the UL subframes and the DL subframes for HARQ-ACK/NACK specified for each of the seven TDD UL/DL configurations (see Section 10.1.3.1 of 3GPP TS 36.213 V12.2.0). For example, in the case of the TDD UL/DL configuration 0, HARQ-ACK/NACK transmitted in the UL subframe #2 indicates the CRC result of DL data transmitted in the DL subframe which is located six subframes in advance (i.e., the DL subframe #6 in the previous radio frame). Similarly, in the case of the TDD UL/DL configuration 0, HARQ-ACK/NACK transmitted in the UL subframe #4 indicates the CRC result of DL data transmitted in the DL subframe which is located four subframes in advance (i.e., the DL subframe #0 in the same radio frame). FIG. 6 shows the mapping between the UL subframes and the DL subframes for HARQ-ACK/NACK in the TDD UL/DL configuration 0.

TABLE 1

| | Downlink association for TDD | | | | | | | | | |
|---|---|---|---|---|---|---|---|---|---|---|
| TDD UL/DL | Subframe n | | | | | | | | | |
| configuration | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 6, 4 | — | — | — | — | 8, 7, 6, 4 | — | — |
| 3 | — | — | 11, 7, 6 | 6, 5 | 5, 4 | — | — | — | — | — |
| 4 | — | — | 12, 11, 8, 7 | 7, 6, 5, 4 | — | — | — | — | — | — |
| 5 | — | — | 13, 12, 11, 9, 8, 7, 6, 5, 4 | — | — | — | — | — | — | — |
| 6 | — | — | — | 7 | 5 | — | — | 7 | 7 | — |

As is seen from the mappings used in the TDD UL/DL configurations shown in Table 1, the HARQ RTT in the TDD operation is generally longer than that in the FDD operation. This is because the delay time (T_UL_ACK) from the DL data transmission to the ACK/NACK transmission in the TDD operation is equal to or longer than the delay time (i.e., four subframes) in the FDD operation. As described above, the HARQ RTT (i.e., T_UL_ACK+T_eNB_processing) depends on T_UL_ACK. For example, in the case of the TDD UL/DL configuration 0, the maximum value of the delay time T_UL_ACK is 6. Therefore, assuming that the typical length of T_eNB_processing is four subframes (4 milliseconds), the longest HARQ RTT in the TDD UL/DL configuration 0 is assumed to be 10 subframes (10 milliseconds). Further, in the case of the TDD UL/DL configuration 5, the maximum value of the delay time T_UL_ACK is 13. Therefore, the longest HARQ RTT in the TDD UL/DL configuration 5 is assumed to be 17 subframes (17 milliseconds).

The maximum number ($M_{DL\_HARQ}$) of HARQ processes in the TDD operation should be determined based on the longest HARQ RTT in each TDD UL/DL configuration and the total number of DL subframes and special subframes that exist within the longest HARQ RTT. Therefore, the maximum number ($M_{DL\_HARQ}$) of HARQ processes varies depending on the TDD UL/DL configuration. Table 2 shows the maximum number ($M_{DL\_HARQ}$) of downlink HARQ processes in each TDD UL/DL configuration specified in Section 7 of 3GPP TS 36.213 V12.2.0.

TABLE 2

Maximum number of HARQ process for TDD

| TDD UL/DL configuration | Maximum number of HARQ process |
| --- | --- |
| 0 | 4 |
| 1 | 7 |
| 2 | 10 |
| 3 | 9 |
| 4 | 12 |
| 5 | 15 |
| 6 | 6 |

Furthermore, the 3GPP Release 10 and beyond specifies the carrier aggregation (CA). In the carrier aggregation, the radio terminal is configured with multiple carriers (referred to as Component Carriers (CCs)) on different frequencies by the base station, and can use these multiple component carriers for uplink communication, downlink communication, or both. Release 10 specifies the carrier aggregation of five CCs at maximum.

The multiple CCs include one primary CC and one or more secondary CCs. The primary CC is also referred to as a primary frequency. The secondary CC is also referred to as a secondary frequency. The primary CC is a CC used for the primary cell (PCell). The primary cell (PCell), which is operated on the primary CC, is a cell in which the radio terminal performs an initial connection establishment, in which the radio terminal performs connection re-establishment, or which is indicated as being a primary cell in a handover procedure. The secondary cell (SCell), which is operated on the secondary CC, is different from the PCell. In general, the secondary cell (SCell) is additionally configured after the radio terminal has established a radio resource control (RRC) connection in the primary cell, and is used to provide the radio terminal with additional radio resources. The radio terminal can simultaneously use multiple serving cells including one primary cell and at least one secondary cell.

Further, in the CA, self-scheduling or cross-carrier scheduling can be used. The self-scheduling is a scheduling method in which a scheduling grant (DL grant or UL grant) is transmitted on the same component carrier as that used by the radio terminal for the DL data reception or the UL data transmission. Cross-carrier scheduling is a scheduling method in which a scheduling grant is transmitted on a different component carrier from that used by the radio terminal for the DL data reception or the UL data transmission. Specifically, in the case of self-scheduling, in order for the scheduling of a certain serving cell to be effective, the radio terminal is configured to monitor a PDCCH transmitted on this serving cell. In the case of cross-carrier scheduling, in order for the scheduling of a certain serving cell (e.g., SCell) to be effective, the radio terminal is configured to monitor a PDCCH transmitted on another serving cell (e.g., PCell).

Note that in 3GPP Release 10, either only FDD component carriers or only TDD component carriers can be aggregated. On the other hand, the 3GPP Release 12 and beyond specifies the CA of an FDD component carrier(s) (FDD CC(s)) with a TDD component carrier(s) (TDD CC(s)). The FDD CC (or FDD cell) is a cell using the frame structure type 1 for FDD. The TDD CC (or TDD cell) is a cell using the frame structure type 2 for TDD. In this description, this type of carrier aggregation is referred to as "FDD-TDD aggregation", or simply as "FDD-TDD".

In the FDD-TDD carrier aggregation, the primary cell may be an FDD CC (FDD cell) or a TDD CC (TDD cell). In the FDD-TDD, when the primary cell is a TDD cell and the serving cell (i.e., the secondary cell) is an FDD cell, the maximum number of downlink HARQ processes for this FDD serving cell (secondary cell) is expected to be larger than the value for a FDD cell when the CA is not configured. This is because, when a UL ACK/NACK responsive to DL transmission on the FDD serving cell (secondary cell) is transmitted in accordance with the UL/DL configuration of the TDD primary cell, the HARQ RTT in the FDD serving cell is become larger than when the CA is not configured.

Specifically, 3GPP TS 36.213 V12.2.0 specifies that if the FDD-TDD CA is configured, if the primary cell is a TDD CC (TDD cell) and the serving cell is an FDD CC (FDD cell), and if the self-scheduling is configured for DL transmission in the secondary cell, mapping between the UL subframes and the DL subframes for HARQ-ACK/NACK of the secondary cell shall follow the following Table 3 (see Section 10 of 3GPP TS 36.213 V12.2.0). Note that the "DL-reference UL/DL configuration" in Table 3 indicates the UL/DL configuration of the primary cell.

TABLE 3

Downlink association for FDD-TDD and serving cell frame structure type 1

| DL-reference UL/DL configuration | Subframe n | | | | | | | | | |
| --- | --- | --- | --- | --- | --- | --- | --- | --- | --- | --- |
|  | 0 | 1 | 2 | 3 | 4 | 5 | 6 | 7 | 8 | 9 |
| 0 | — | — | 6, 5 | 5, 4 | 4 | — | — | 6, 5 | 5, 4 | 4 |
| 1 | — | — | 7, 6 | 6, 5, 4 | — | — | — | 7, 6 | 6, 5, 4 | — |

TABLE 3-continued

Downlink association for FDD-TDD and serving cell frame structure type 1

| DL-reference UL/DL configuration | Subframe n | | | | | | | | | |
|---|---|---|---|---|---|---|---|---|---|---|
| | 0 | 1 | 2 | 3 | 4 | 5 | 6 | 7 | 8 | 9 |
| 2 | — | — | 8, 7, 6, 5, 4 | — | — | — | — | 8, 7, 6, 5, 4 | — | — |
| 3 | — | — | 11, 10, 9, 8, 7, 6 | 6, 5 | 5, 4 | — | — | — | — | — |
| 4 | — | — | 12, 11, 10, 9, 8, 7 | 7, 6, 5, 4 | — | — | — | — | — | — |
| 5 | — | — | 13, 12, 11, 10, 9, 8, 7, 6, 5, 4 | — | — | — | — | — | — | — |
| 6 | — | — | 8, 7 | 7, 6 | 6, 5 | — | — | 7 | 7, 6, 5 | — |

For example, when the UL/DL configuration (DL-reference UL/DL configuration) of the TDD primary cell is the configuration 0, in the UL subframe #2, the HARQ feedback (ACK/NACK) for two DL transport blocks, which were transmitted six subframes ago and five subframes ago, is transmitted in accordance with the definition in Table 3. Assuming that the typical length of T_eNB_processing is four subframes (4 milliseconds) as described above, the typical longest HARQ RTT in the FDD serving cell when the TDD primary cell has the UL/DL configuration 0 is 10 subframes (10 milliseconds). Similarly, when the TDD primary cell has the UL/DL configurations 1 to 6, the typical longest HARQ RTTs in the FDD serving cell is 11, 12, 15, 16, 17 and 12, respectively.

Therefore, 3GPP TS 36.213 V12.2.0 specifies that if the FDD-TDD CA is configured and if the primary cell is a TDD cell and the serving cell (i.e., the secondary cell) is an FDD cell, the maximum number of HARQ processes for the serving cell shall be determined in accordance with the following Table 4 (see Section 7 of 3GPP TS 36.213 V12.2.0). Note that the "DL-reference UL/DL configuration" in Table 4 indicates the UL/DL configuration of the primary cell.

TABLE 4

Maximum number of HARQ process for FDD-TDD, primary cell frame structure type 2, and serving cell frame structure type 1

| DL-reference UL/DL configuration | Maximum number of HARQ process |
|---|---|
| 0 | 10 |
| 1 | 11 |
| 2 | 12 |
| 3 | 15 |
| 4 | 16 |
| 5 | 16 |
| 6 | 12 |

Section 7 of 3GPP TS 36.213 V12.2.0 specifies the maximum number ($M_{DL\_HARQ}$) of HARQ processes in the other types of CA as follows. In the case of the FDD CA, the maximum number ($M_{DL\_HARQ}$) of HARQ processes per serving cell is 8. In the case of the TDD CA, the maximum number ($M_{DL\_HARQ}$) of HARQ processes per serving cell is determined in accordance with the above-mentioned Table 2 for TDD. If the FDD-TDD CA is configured and if the primary cell is an FDD CC (FDD cell), the maximum number ($M_{DL\_HARQ}$) of HARQ processes per serving cell is 8. If the FDD-TDD CA is configured and if the primary cell is a TDD CC (TDD cell) and the serving cell is a TDD CC (TDD cell), the maximum number ($M_{DL\_HARQ}$) of HARQ processes for the serving cell is determined in accordance with the above-mentioned Table 2 for TDD.

Returning to the description of the downlink HARQ operation, as described above, incremental redundancy (IR) HARQ is used in the downlink. Accordingly, the radio terminal needs to store soft bits (e.g., a log likelihood ratio (LLR)) related to received data, in which a CRC error has been detected, in a memory so as to combine the soft bits with re-transmitted data. This memory is referred to as a "soft buffer" or a "soft bit buffer". Further, the radio terminal simultaneously manages multiple HARQ processes. That is, the soft buffer included in the radio terminal needs to store the soft bits of the maximum number ($M_{DL\_HARQ}$) of HARQ processes. Therefore, the radio terminal needs to divide the soft buffer based on at least the maximum number ($M_{DL\_HARQ}$) of HARQ processes and secure partitions in the soft buffer for respective HARQ processes.

The method for dividing the soft buffer included in the radio terminal will be described below. The method for dividing the soft buffer is specified in Section 7.1.8 of 3GPP TS 36.213 V12.2.0 and Section 5.1.4.1.2 of 3GPP TS 36.212 V12.1.0. A buffer size $n_{sb}$ per code block is determined in accordance with the following Formulas (1) to (3).

$$n_{SB} = \min\left(N_{cb}, \left\lfloor \frac{N'_{soft}}{C \cdot N_{cells}^{DL} \cdot K_{MIMO} \cdot \min(M_{DL\_HARQ}, M_{limit})} \right\rfloor\right) \quad (1)$$

$$N_{cb} = \min\left(\left\lfloor \frac{N_{IR}}{C} \right\rfloor, K_w\right) \quad (2)$$

$$N_{IR} = \left\lfloor \frac{N_{soft}}{K_C \cdot K_{MIMO} \cdot \min(M_{DL\_HARQ}, M_{limit})} \right\rfloor \quad (3)$$

In Formulas (1) to (3), $n_{sb}$ and $N_{cb}$ each represent the partition size per code block in the soft buffer. $N_{IR}$ represents the partition size per transport block in the soft buffer. $N'_{soft}$ and $N_{soft}$ each represent the total size of the soft buffer included in the radio terminal. C represents the number of code blocks into which the transport block is divided. $N_{cells}^{DL}$ represents the total number of CCs configured in the ratio terminal for CA. $K_{MIMO}$ represents the number of multiple-input multiple-output (MIMO) layers. $K_w$ represents the length of a circular buffer provided in the base station and corresponds to the code block length after performing turbo coding, subblock interleaving, and bit collection. $K_C$ is determined by the following: if $N_{soft}$=35982720, Kc=5, else if $N_{soft}$=3654144 and the radio terminal is capable of supporting no more than a maximum of two spatial layers, Kc=2, else Kc=1. $M_{limit}$ is a constant equal to 8. $M_{DL\_HARQ}$ represents the maximum number of HARQ processes in the serving cell.

$N'_{soft}$ or $N_{soft}$, which is the total size of the soft buffer, is referred to as the total number of soft channel bits, and depends on the capability of the radio terminal (i.e., UE Category). Table 5 shows the total number of soft channel bits (i.e., the total size of the soft buffer) that should be included in the radio terminal for each UE Category, which is specified in Section 4.1 of 3GPP TS 3GPP TS 36.306 V12.1.0.

TABLE 5

Total number of soft channel bits set by the UE Category

| UE Category | Total number of soft channel bits |
|---|---|
| Category 1 | 250368 |
| Category 2 | 1237248 |
| Category 3 | 1237248 |
| Category 4 | 1827072 |
| Category 5 | 3667200 |
| Category 6 | 3654144 |
| Category 7 | 3654144 |
| Category 8 | 35982720 |

CITATION LIST

Patent Literature

[Patent Literature 1] US Patent Application Publication No. 2012/0057529
[Patent Literature 2] US Patent Application Publication No. 2013/0176981
[Patent Literature 3] US Patent Application Publication No. 2012/0275397
[Patent Literature 4] US Patent Application Publication No. 2012/0188952
[Patent Literature 5] US Patent Application Publication No. 2013/0343239

Non Patent Literature

[Non Patent Literature 1] 3GPP TS 36.306 V12.1.0 (2014-06) "3rd Generation Partnership Project; Technical Specification Group Radio Access Network; Evolved Universal Terrestrial Radio Access (E-UTRA); User Equipment (UE) radio access capabilities (Release 12)", June, 2014
[Non Patent Literature 2] 3GPP TS 36.212 V12.1.0 (2014-06) "3rd Generation Partnership Project; Technical Specification Group Radio Access Network; Evolved Universal Terrestrial Radio Access (E-UTRA); Multiplexing and channel coding (Release 12)", June, 2014
[Non Patent Literature 3] 3GPP TS 36.213 V12.2.0 (2014-06) "3rd Generation Partnership Project; Technical Specification Group Radio Access Network; Evolved Universal Terrestrial Radio Access (E-UTRA); Physical layer procedures (Release 12)", June, 2014

SUMMARY OF INVENTION

Technical Problem

3GPP TS 36.213 V12.2.0 specifies that, if the FDD-TDD CA is configured and if the primary cell is a TDD CC (TDD cell) and the serving cell is an FDD CC (FDD cell), the maximum number $M_{DL\_HARQ}$ of HARQ processes in the serving cell shall be determined in accordance with the above-mentioned Table 4. However, this definition may be improper when cross-carrier scheduling is configured for DL transmission in the FDD serving cell. This is because when cross-carrier scheduling is configured for DL transmission in the FDD serving cell in the FDD-TDD CA, subframes in which DL transmission can be scheduled in the FDD serving cell are restricted, which may make it difficult to operate HARQ processes in parallel up to the maximum number of HARQ processes shown in Table 4.

Note that Patent Literature 1 to 4 disclose methods for dividing a soft buffer during the CA. Patent Literature 5 discloses a modification of mapping between UL subframes and DL subframes for HARQ-ACK/NACK, assuming a case where cross-carrier scheduling is performed in the FDD-TDD CA. However, Patent Literature 1 to 5 do not disclose the technique in which, if the FDD-TDD CA is configured and if the primary cell is a TDD CC (TDD cell) and the serving cell is an FDD CC (FDD cell), the maximum number $M_{DL\_HARQ}$ of HARQ processes used for DL transport blocks transmitted in the FDD serving cell is changed depending on whether or not cross-carrier scheduling is configured for DL transmission on the FDD serving cell.

As described above, in the existing 3GPP Release 12, when the FDD-TDD CA is configured and cross-carrier scheduling is configured for DL transmission in the FDD serving cell, there is a possibility that the maximum number $M_{DL\_HARQ}$ of HARQ processes used for DL transport blocks transmitted in the FDD serving cell is not appropriately determined. The maximum number $M_{DL\_HARQ}$ of HARQ processes that has not been appropriately determined has an adverse effect, for example, on partitioning of the soft buffer. As is clear from Formulas (1) to (3), in the calculation of $n_{sb}$, $N_{cb}$ and $N_{IR}$, the total size $N'_{soft}$ or $N_{soft}$ of the soft buffer is divided by min($M_{DL\_HARQ}$, $M_{limit}$). This is because the partitions of the soft buffer are secured for respective HARQ processes. Therefore, if the maximum number $M_{DL\_HARQ}$ of HARQ processes in the FDD serving cell is determined to be an inappropriately large value, there is a possibility that the size of each partition in the soft buffer to be allocated to each HARQ process is inappropriately reduced.

Therefore, an object to be attained by embodiments disclosed herein is to provide an apparatus, a method, and a program which contribute to appropriate determination of the maximum number of HARQ processes used for DL transport blocks transmitted in an FDD serving cell when the FDD-TDD CA is configured and when cross-carrier scheduling is configured for DL transmission in the FDD serving cell. Other objects or problems and novel features will be made apparent from the following description and the accompanying drawings.

Solution to Problem

In a first aspect, a method for performing downlink HARQ in a radio terminal which is configured by a base station with a plurality of component carriers including first and second component carriers for carrier aggregation includes, if a frame structure of a first serving cell operated using the first component carrier is a frame structure type 2 for time division duplex (TDD) and a frame structure of a second serving cell operated using the second component carrier is a frame structure type 1 for frequency division duplex (FDD), determining a maximum number of downlink hybrid automatic repeat request (HARQ) processes used for downlink transport blocks received in the second serving cell based on whether or not the radio terminal is configured to monitor a first downlink control channel in the first serving cell for scheduling the second serving cell.

In a second aspect, a radio terminal includes a processor and a memory that is used as a soft buffer configured to store soft bits for downlink HARQ. The processor is configured to perform the method according to the first aspect described above.

In a third aspect, a method, performed by a base station that allocates a plurality of component carriers including first and second component carriers to a radio terminal for carrier aggregation, includes:

(a) if a frame structure of a first serving cell operated using the first component carrier is a frame structure type 2 for time division duplex (TDD) and a frame structure of a second serving cell operated using the second component carrier is a frame structure type 1 for frequency division duplex (FDD), determining a maximum number of downlink hybrid automatic repeat request (HARQ) processes used for downlink transport blocks received in the second serving cell based on whether or not the radio terminal is configured to monitor a first downlink control channel in the first serving cell for scheduling the second serving cell; and (b) transmitting downlink transport blocks by using multiple HARQ processes in accordance with the maximum number.

In a fourth aspect, a base station includes a processor and a transceiver. These processor and transceiver are configured to perform the method according to the third aspect described above.

In a fifth aspect, a method, performed by a base station that allocates a plurality of component carriers including first and second component carriers to a radio terminal for carrier aggregation, includes transmitting control information from the base station to the radio terminal. If a frame structure of a first serving cell operated using the first component carrier is a frame structure type 2 for time division duplex (TDD) and a frame structure of a second serving cell operated using the second component carrier is a frame structure type 1 for frequency division duplex (FDD), the control information indicates whether or not there is a need to change a table to be used for determining, by the radio terminal, a maximum number of downlink hybrid automatic repeat request (HARQ) processes used for downlink transport blocks received in the second serving cell depending on whether or not the radio terminal is configured to monitor a first downlink control channel in the first serving cell for scheduling the second serving cell.

In a sixth aspect, a base station includes a transceiver. The transceiver is configured to configure a radio terminal with a plurality of component carriers including first and second component carriers for carrier aggregation and communicate with the radio terminal on the plurality of component carriers. The transceiver is further configured to transmit control information to the radio terminal. Like the control information according to the firth aspect, the control information according to the sixth aspect indicates whether or not there is a need to change a table to be used for determining, by the radio terminal, a maximum number of downlink hybrid automatic repeat request (HARQ) processes used for downlink transport blocks received in the second serving cell.

In a seventh aspect, a method, performed by a base station that allocates a plurality of component carriers including first and second component carriers to a radio terminal for carrier aggregation, includes transmitting control information from the base station to the radio terminal. If a frame structure of a first serving cell operated using the first component carrier is a frame structure type 2 for time division duplex (TDD) and a frame structure of a second serving cell operated using the second component carrier is a frame structure type 1 for frequency division duplex (FDD), the control information indicates a maximum number of downlink hybrid automatic repeat request (HARQ) processes used for downlink transport blocks received in the second serving cell. The control information further indicates the maximum number that varies depending on whether or not the radio terminal is configured to monitor a first downlink control channel in the first serving cell for scheduling the second serving cell.

In an eighth aspect, a base station includes a transceiver. The transceiver is configured to configure a radio terminal with a plurality of component carriers including first and second component carriers for carrier aggregation, and communicate with the radio terminal on the plurality of component carriers. The transceiver is further configured to transmit control information to the radio terminal. Like the control information according to the above-mentioned seventh aspect, the control information according to the eighth aspect indicates the maximum number of downlink hybrid automatic repeat request (HARQ) processes used for downlink transport blocks received in the second serving cell.

In a ninth aspect, a program includes a set of instructions (software codes) that, when loaded into a computer, causes the computer to perform the method according to the above-described first aspect.

In a tenth aspect, a program includes a set of instructions (software codes) that, when loaded into a computer, causes the computer to perform the method according to the above-described third, fifth, or seventh aspect.

Advantageous Effects of Invention

According to the above-mentioned aspects, it is possible to provide an apparatus, a method, and a program that contribute to appropriate determination of the maximum number of HARQ processes used for DL transport blocks transmitted in an FDD serving cell when the FDD-TDD CA is configured and when cross-carrier scheduling is configured for DL transmission in the FDD serving cell.

BRIEF DESCRIPTION OF DRAWINGS

FIG. 2 is a table showing seven UL-DL configurations defined for TDD LTE;

FIG. 9A is a timing diaphragm showing an example of DL transmission when an FDD-TDD CA is configured and when cross-carrier scheduling including monitoring a PDCCH in a TDD serving cell (i.e., a TDD PCell or a TDD SCell) is configured for DL transmission in the FDD SCell;

FIG. 9B is a timing diaphragm showing an example of DL transmission when the FDD-TDD CA is configured and when self-scheduling is configured for DL transmission in the FDD SCell;

FIG. 10A is a diagram showing a specific example of partitioning of a soft buffer when the FDD-TDD CA is configured and when cross-carrier scheduling including monitoring the PDCCH in the PDD PCell is configured for DL transmission in the FDD SCell;

DESCRIPTION OF EMBODIMENTS

Figure 1:
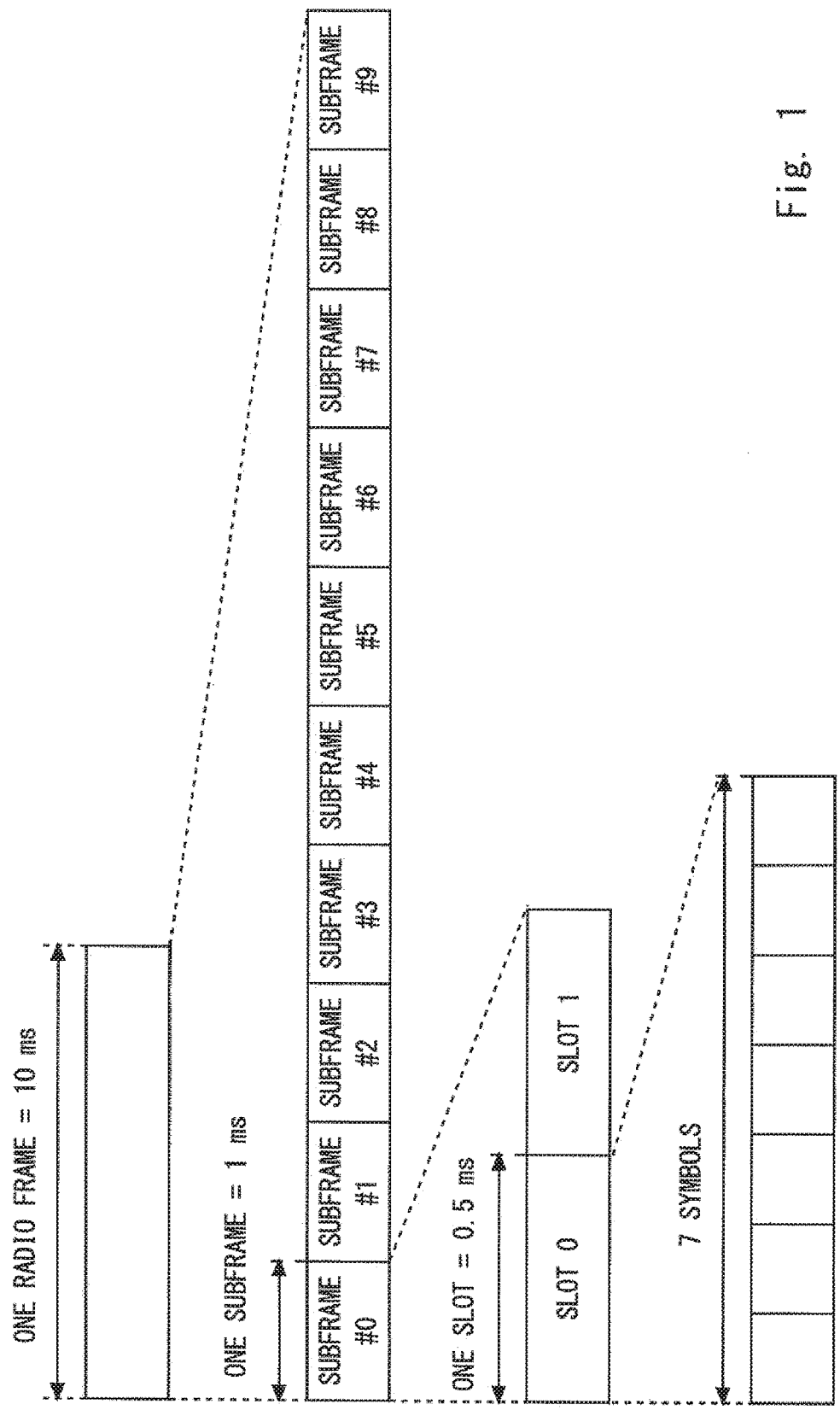
FIG. 1 is a diagram showing a radio frame structure and a subframe structure of LTE.
Figure 3:
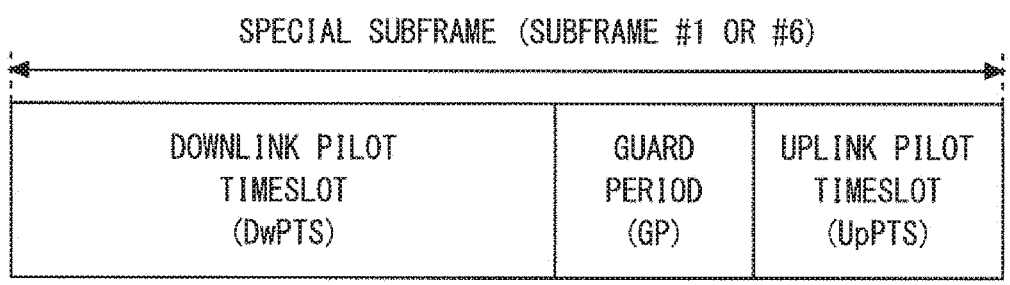
FIG. 3 is a diagram showing a structure of a special subframe defined for TDD LTE.
Figure 4:
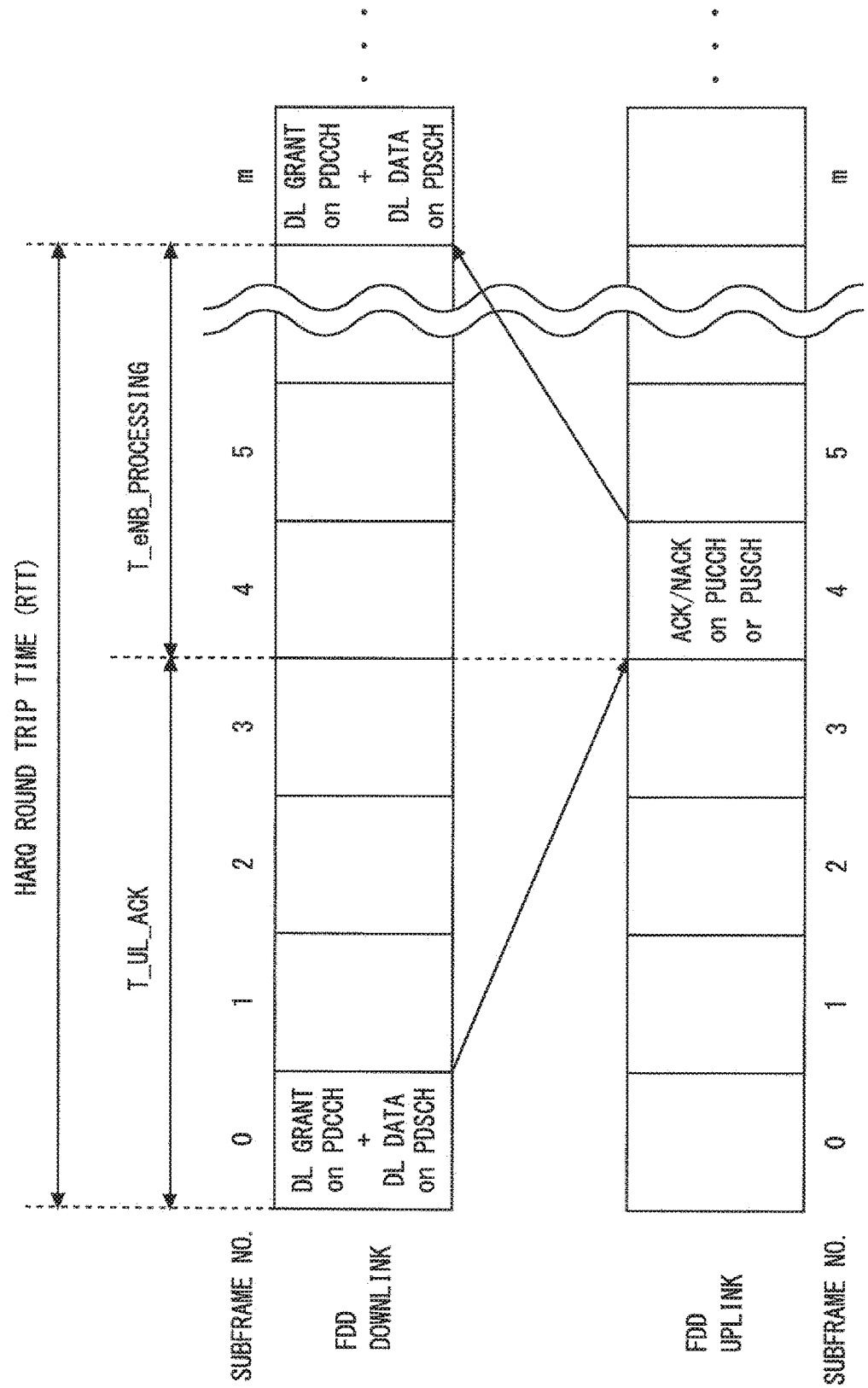
FIG. 4 is a timing diagram of a downlink HARQ process (stop and wait (SAW) process)
Figure 5:
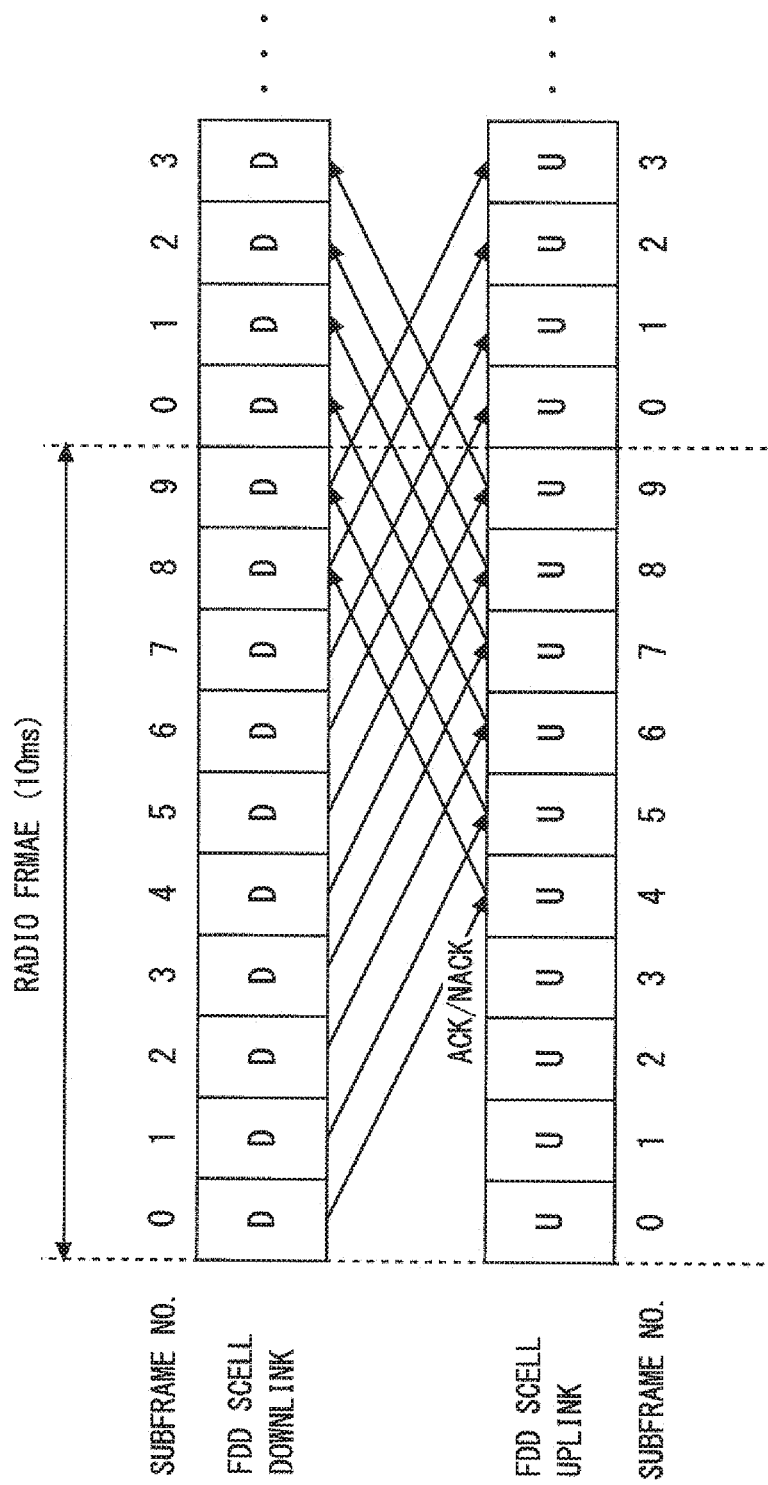
FIG. 5 is a timing diaphragm showing a state in which eight downlink HARQ processes are temporally interlaced and used.
Figure 6:
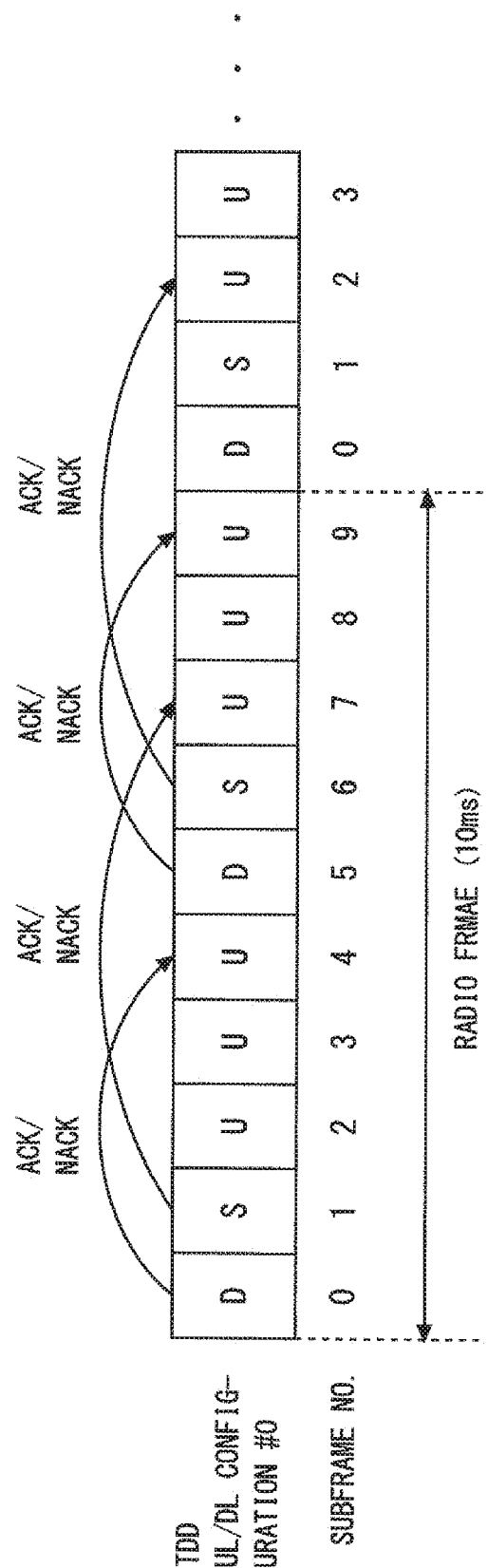
FIG. 6 is a diagram showing mapping between UL subframes and DL subframes for HARQ-ACK/NACK in a TDD UL/DL configuration 0.

Specific embodiments will be described in detail below with reference to the drawings. In the drawings, the same or corresponding elements are denoted by the same reference signs, and repetitive descriptions will be avoided as necessary for clarity of explanation.

First Embodiment

Figure 7:
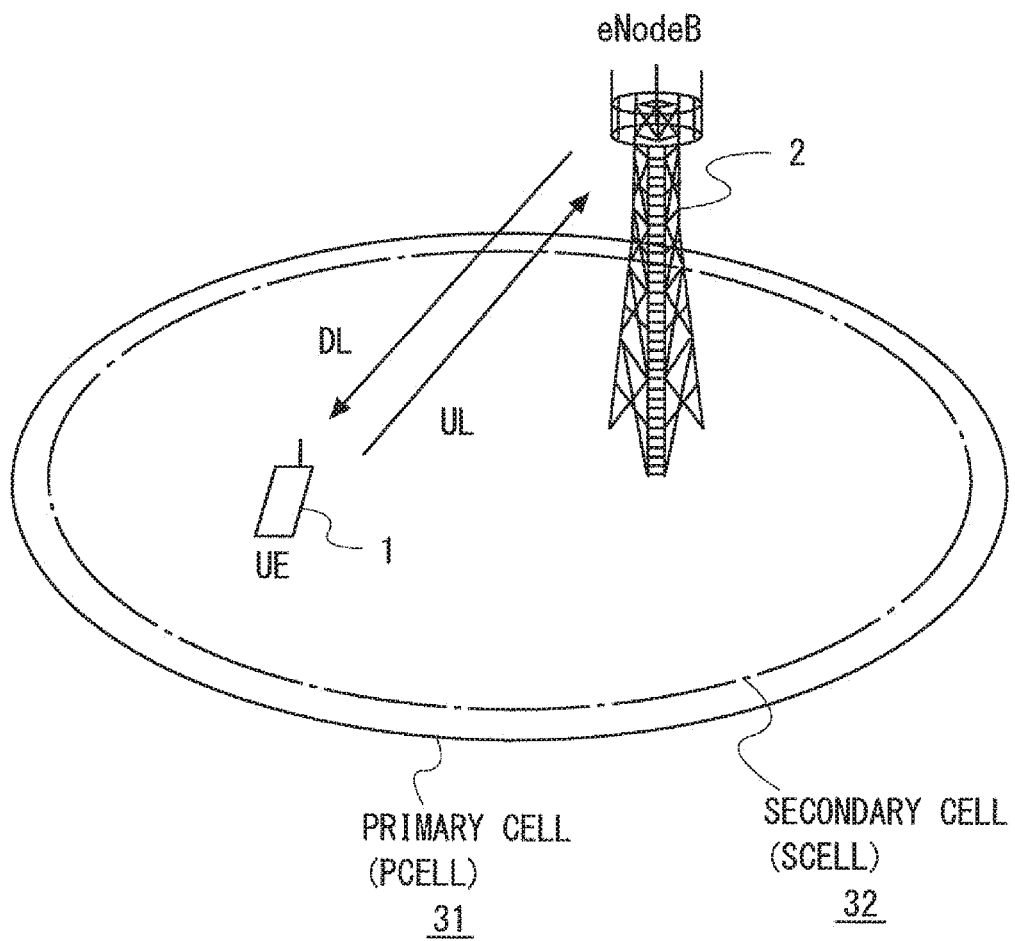
FIG. 7 is a diagram showing a configuration example of a radio communication system according to a first embodiment.

FIG. 7 shows a configuration example of a radio communication system according to this embodiment. The radio communication system provides communication services, such as voice communication or packet data communication or both, for example. Referring to FIG. 7, the radio communication system includes a radio terminal 1 and a base station 2. This embodiment will be described assuming that the radio communication system is a system of 3GPP Release 8 and beyond. Specifically, the radio terminal 1 corresponds to a user equipment (UE), and the base station 2 corresponds to an eNodeB. The radio terminal 1 and the base station 2 support FDD-TDD carrier aggregation (CA). The radio terminal 1 is configured by the base station 2 with the FDD-TDD CA in which a primary cell (PCell) 31 uses TDD (i.e., frame structure type 2) and a secondary cell (SCell) 32 uses FDD (i.e., frame structure type 1).

Figure 8:
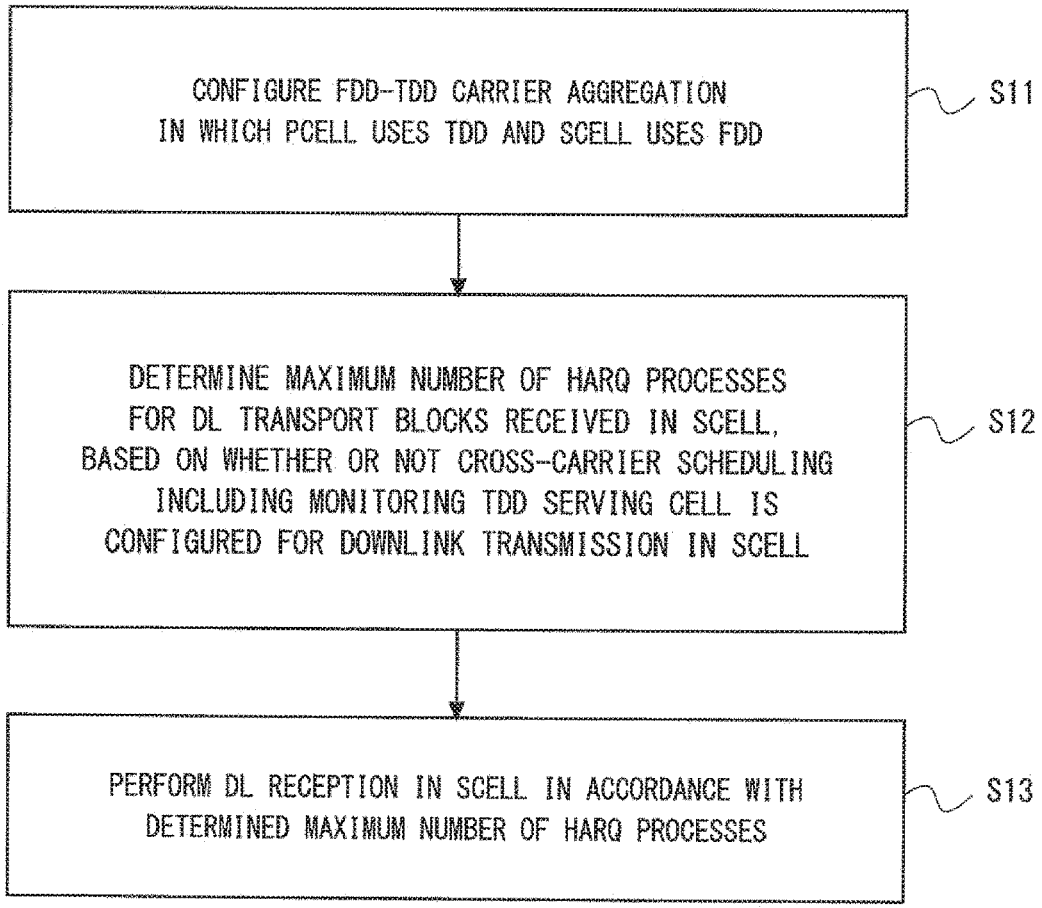
FIG. 8 is a flowchart showing an example of the operation, performed by a radio terminal, for determining the maximum number ($M_{DL\_HARQ}$) of HARQ processes used for DL transmission in an FDD SCell according to the first embodiment.

In the following, a method performed by the radio terminal for receiving DL transport blocks in the SCell 32 according to this embodiment is described. The flowchart of FIG. 8 shows an example of the operation performed by the radio terminal 1 for determining the maximum number ($M_{DL\_HARQ}$) of HARQ processes used for DL transmission in the FDD SCell 32 according to this embodiment. In step S11, the radio terminal 1 configures FDD-TDD carrier aggregation in which the PCell 31 uses TDD and the SCell 32 uses FDD. The radio terminal 1 may be configured by the base station 2 with FDD-TDD CA in which three or more serving cells including the PCell 31 and the SCell 32 and at least one additional SCell are aggregated. At least one additional SCell may be a TDD cell or an FDD cell.

In step S12, the radio terminal 1 determines the maximum number ($M_{DL\_HARQ}$) of HARQ processes used for DL transport blocks received in the SCell 32 based on whether or not cross-carrier scheduling including monitoring the TDD serving cell (i.e., the PCell 31 or an additional TDD SCell) is configured for DL transmission in the SCell 32, which is the FDD cell. Specifically, when cross-carrier scheduling including monitoring the TDD serving cell is configured for DL transmission in the FDD SCell 32, the maximum number ($M_{DL\_HARQ}$) of DL HARQ processes for the SCell 32 may be set to a value smaller than that when the cross-carrier scheduling is not configured (i.e., in the case of self-scheduling). More specifically, when the radio terminal 1 is configured to monitor the PDCCH in the TDD serving cell (i.e., the PCell 31 or an additional TDD SCell) for scheduling DL transmission in the FDD SCell 32, the radio terminal 1 may determine the maximum number ($M_{DL\_HARQ}$) of HARQ processes used for DL transport blocks received in the FDD SCell 32 in accordance with the above-mentioned Table 2, which is used for TDD.

When cross-carrier scheduling including monitoring the TDD serving cell (i.e., the TDD PCell 31 or an additional TDD SCell) is configured for DL transmission in the FDD SCell 32, the FDD SCell 32 can generally transmit to the radio terminal 1 only in some DL subframes, which are located at positions corresponding to a special subframe(s) and UL subframe(s) within the TDD serving cell, among ten DL subframes in one radio frame. Note that, the case where multiple DL grants for a plurality of DL subframes are sent in one subframe (UL subframe or special subframe) of the TDD serving cell is excluded from consideration. Further, the radio terminal 1 can generally transmit an HARQ ACK/NCAK regarding DL reception in the FDD SCell 32 only in an UL subframe of the TDD serving cell. Note that, the case where an HARQ-ACK/NACK, which is responsive to DL transmission based on the DL grant for the FDD SCell 32 that has been sent on the TDD serving cell, is transmitted to an UL subframe of the FDD SCell 32 is excluded from consideration. In these circumstances, it is appropriate that the maximum number ($M_{DL\_HARQ}$) of HARQ processes used for DL transmission in the SCell 32 is determined in accordance with Table 2, instead of Table 4. This is because the opportunity of DL transmission in the SCell 32 depends on the DL/UL configuration of the TDD serving cell.

FIG. 9A shows an example of the DL transmission when cross-carrier scheduling including monitoring a PDCCH in the TDD PCell 31 is configured for DL transmission in the FDD SCell 32. In the example of FIG. 9A, the TDD PCell 31 has the UL/DL configuration 0. In the example of FIG. 9A, DL grants can be transmitted in the DL subframes #0 and #5 and special subframes #1 and #6 of the TDD PCell 31. Therefore, the radio terminal 1 can receive only in the DL subframes #0, #1, #5 and #6 in the FDD SCell 32. Accordingly, HARQ feedbacks (ACK/NACK) can be transmitted in the UL subframes #2, #4, #7, and #9 of the TDD PCell 31 in accordance with mapping shown in Table 1. In FIG. 9A, four types of hatching indicate four temporally interlaced DL HARQ processes (SAW processes). That is, in the example of FIG. 9A, up to four DL HARQ processes (SAW processes) are used in parallel.

On the other hand, when the radio terminal 1 is configured to monitor a PDCCH in the FDD SCell 32 for scheduling DL transmission in the FDD SCell 32 (i.e., when self-scheduling is configured for DL transmission in the SCell 32), the radio terminal 1 may determine the maximum number ($M_{DL\_HARQ}$) of HARQ processes used for DL transport blocks received in the SCell serving cell in accordance with the above-mentioned Table 4.

FIG. 9B shows an example of DL transmission in the FDD SCell 32 when self-scheduling, which includes monitoring a PDCCH in the FDD SCell 32, is configured. In the example of FIG. 9B, the TDD PCell 31 has the UL/DL configuration 0. In the example of FIG. 9A, DL grants can be transmitted in all DL subframes #0 to #9 of the FDD SCell 32. Therefore, the radio terminal 1 can receive in all DL subframes #0 to #9 in the FDD SCell 32. Accordingly, the HARQ feedbacks (ACK/NACK) can be transmitted in the UL subframes #2 to #4 and #7 to #9 of the FDD SCell 32 in accordance with mapping shown in Table 3. In the UL subframes #2, #3, #7, and #8, which are associated with two or more DL subframes, HARQ-ACK/NACK bundling is used. In the example of FIG. 9B, up to ten DL HARQ processes (SAW processes) are used in parallel.

Referring back to FIG. 8, the description will be continued. In step S13, the radio terminal 1 performs DL reception in the SCell 32 in accordance with the maximum number ($M_{DL\_HARQ}$) of HARQ processes for DL transmission in the SCell 32, which has been determined in step S12. For example, the radio terminal 1 may determine a partition size (i.e., $N_{IR}$, $N_{cb}$, or $n_{sb}$) in the soft buffer to be allocated to each HARQ process used for each DL transport block received in the SCell 32 by using the maximum number ($M_{DL\_HARQ}$) of HARQ processes for DL transmission in the SCell 32, which has been determined in step S12. The radio terminal 1 may calculate the partition size $N_{IR}$ per transport block in the soft buffer in accordance with the above-mentioned Formula (3) by using the maximum number ($M_{DL\_HARQ}$) of HARQ processes determined in step S12. The radio terminal 1 may calculate the partition size $N_{cb}$ per code block in the soft buffer in accordance with the above-mentioned Formula (2) by using the maximum number ($M_{DL\_HARQ}$) of HARQ processes determined in step S12. The radio terminal 1 may calculate the partition size $n_{sb}$ per code block in the soft buffer in accordance with the above-mentioned Formula (1) by using the maximum number ($M_{DL\_HARQ}$) of HARQ processes determined in step S12.

FIG. 10A shows a specific example of partitioning of the soft buffer when the FDD-TDD CA is configured and when cross-carrier scheduling including monitoring a PDCCH in the TDD serving cell (i.e., the TDD PCell 31 or another TDD SCell) is configured for DL transmission in the FDD SCell 32. In the example of FIG. 10A, two serving cells (CCs), i.e., the TDD PCell 31 and the FDD SCell are aggregated. Thus, $N_{cells}^{DL}$ is equal to 2. For ease of explanation, assume that Kc=1 and $K_{MIMO}$=1. Further in the example of FIG. 10A, the TDD PCell 31 has the UL/DL configuration 0, like in FIG. 9A. Accordingly, based on the above-mentioned Table 2, the maximum number ($M_{DL\_HARQ}$) of HARQ processes used for DL transmission in the SCell 32 is determined to be four. In this case, one half region of the soft buffer (total size $N_{soft}$) included in the radio terminal 1 is used for DL reception in the PCell 31, and the other half of the soft buffer is used for DL reception in the SCell 32. Further, the region for DL reception in the SCell 32 is divided into four partitions 801 for four DL HARQ processes at maximum. This is understood from the calculation of $n_{sb}$, $N_{cb}$, and $N_{IR}$ shown in Formulas (1) to (3), in which the total size $N'_{soft}$ or $N_{soft}$ of the soft buffer is divided by min($M_{DL\_HARQ}$, $M_{limit}$). $M_{limit}$ is a constant equal to 8.

Figure 10B:
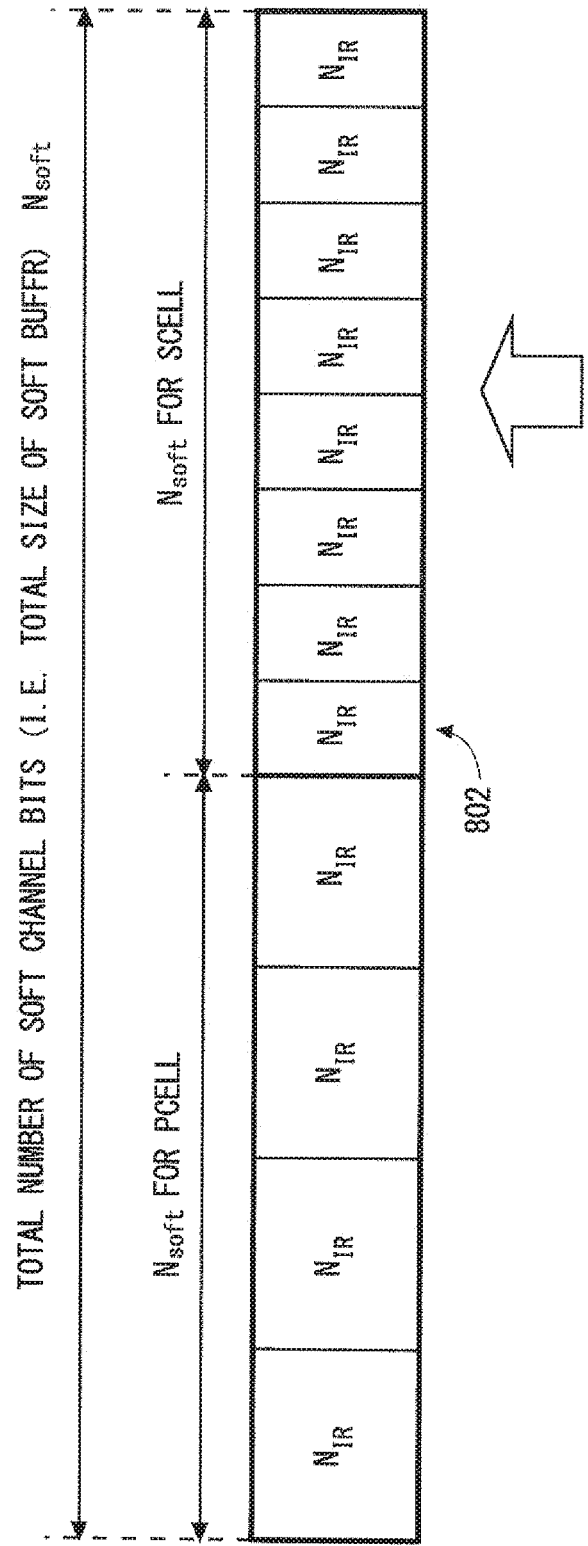
FIG. 10B is a diagram showing a specific example of partitioning of a soft buffer when the FDD-TDD CA is configured and self-scheduling including monitoring the PDCCH in the FDD SCell is configured for DL transmission in the FDD SCell.

FIG. 10B shows a specific example of partitioning of the soft buffer when the FDD-TDD CA is configured and when self-scheduling including monitoring a PDCCH in the FDD SCell 32 is configured for DL transmission in the FDD SCell 32. In the example of FIG. 10B, two serving cells (CCs), i.e., the TDD PCell 31 and the FDD SCell are aggregated, like in the example of FIG. 10A. Thus, $N_{cells}^{DL}$ is equal to 2. For ease of explanation, assume that Kc=1 and $K_{MIMO}$=1. Further, in the example of FIG. 10B, the TDD PCell 31 has the UL/DL configuration 0, like in FIG. 9B. Accordingly, based on the above-mentioned Table 4, the maximum number ($M_{DL\_HARQ}$) of HARQ processes used for DL transmission on the SCell 32 is determined to be 10. In this case, one half of the soft buffer (total size $N_{soft}$) included in the radio terminal 1 is used for DL reception in the PCell 31, and the other half of the soft buffer is used for DL reception in the SCell 32. Further, the region for DL reception in the SCell 32 is divided into eight partitions 802 for ten DL HARQ processes at maximum. This is understood from the calculation of $n_{sb}$, $N_{cb}$, and $N_{IR}$ shown in Formulas (1) to (3), in which the total size $N'_{soft}$ or $N_{soft}$ of the soft buffer is divided by min($M_{DL\_HARQ}$, $M_{limit}$). $M_{limit}$ is a constant equal to 8.

As is understood from the above description, in this embodiment, the maximum number ($M_{DL\_HARQ}$) of DL HARQ processes for the SCell 32 is determined based on whether or not the FDD-TDD CA is configured and whether or not cross-carrier scheduling including monitoring a PDCCH in the TDD serving cell (i.e., the TDD PCell 31 or another TDD SCell) is configured for DL transmission in the FDD SCell 32. Therefore, if the FDD-TDD CA is configured and if cross-carrier scheduling including monitoring a PDCCH in the TDD serving cell (i.e., the TDD PCell 31 or another TDD SCell) is configured for DL transmission in the FDD serving cell (SCell 32), the radio terminal 1 according to this embodiment can appropriately determine the maximum number ($M_{DL\_HARQ}$) of HARQ processes used for DL transport blocks transmitted in the FDD serving cell (FDD SCell 32).

In one implementation, For example, when cross-carrier scheduling including monitoring the TDD serving cell is configured for DL transmission in the FDD SCell 32, the maximum number ($M_{DL\_HARQ}$) of DL HARQ processes for the SCell 32 may be set to a value smaller than that when the cross-carrier scheduling is not configured (i.e., in the case of self-scheduling). Due to this implementation, for example, a larger soft buffer partition (e.g., the partition 801 shown in FIG. 10A) can be allocated to one DL HARQ process in the SCell 32 in the case of cross-carrier scheduling, as compared with the case of self-scheduling.

In one implementation, when the radio terminal 1 is configured to monitor a PDCCH in the TDD serving cell (i.e., the PCell 31 or additional TDD SCell) for scheduling DL transmission in the FDD SCell 32, the radio terminal 1 may determine the maximum number ($M_{DL\_HARQ}$) of HARQ processes used for DL transport blocks received in the FDD SCell 32 in accordance with the above-mentioned Table 2, which is used for TDD. Due to this implementation, for example, a larger partition (e.g., the partition 801 shown in FIG. 10A) can be allocated to one HL HARQ process in the SCell 32, as compared with the case of determining the maximum number ($M_{DL\_HARQ}$) of DL HARQ processes for the SCell 32 in accordance with Table 4, which is used for FDD-TDD.

In one implementation, when the FDD-TDD CA is configured and when cross-carrier scheduling including monitoring a PDCCH in the TDD serving cell (i.e., the TDD PCell 31 or another TDD SCell) for the FDD SCell 32 is configured, the maximum number ($M_{DL\_HARQ}$) of actual (valid) DL HARQ processes for the SCell 32 may be used. If an excessive maximum number $M_{DL\_HARQ}$ derived based on self-scheduling is used regardless of whether or not cross-carrier scheduling is configured, partitions (e.g., the partitions 802 shown in FIG. 10B) corresponding to eight DL HRAQ processes are constantly secured. Then, for example, when the PCell 31 uses the UL/DL configuration 0 and cross-carrier scheduling including monitoring a PDCCH in the PCell 31 is configured for DL transmission in the FDD SCell 32, only four partitions out of the eight partitions are actually used, so that the soft buffer of the radio terminal 1 cannot be efficiently used. On the other hand, in this embodiment, the soft buffer of the radio terminal 1 can be efficiently used.

Second Embodiment

This embodiment illustrates a modified example of the method for determining the maximum number ($M_{DL\_HARQ}$) of HARQ processes used for DL transmission in the FDD serving cell that is described in the first embodiment. A configuration example of the radio communication system according to this embodiment may be similar to FIG. 7 described in the first embodiment.

The radio terminal 1 according to this embodiment receives table selection information from the base station 2. The table selection information indicates whether or not there is a need to selectively use the first table (e.g., the above-mentioned Table 2) that defines $M_{DL\_HARQ}$ for TDD and the second table (e.g., the above-mentioned Table 4) that defines $M_{DL\_HARQ}$ for FDD-TDD when the radio terminal 1 determines the maximum number ($M_{DL\_HARQ}$) of DL HRAQ processes for the FDD serving cell (e.g., the SCell 32) when the FDD-TDD CA is configured. When the received table selection information indicates that there is no need to selectively use the first and second tables, the radio terminal 1 determines the maximum number $M_{DL\_HARQ}$ of the FDD SCell 32 from the second table for FDD-TDD, regardless of whether the radio terminal 1 is configured to monitor a PDCCH of the FDD SCell 32 or a PDCCH of the TDD serving cell (e.g., the TDD PCell 31 or another TDD SCell) for DL scheduling of the FDD SCell 32.

On the other hand, when the received table selection information indicates that there is a need to selectively use the first and second tables, the radio terminal 1 may operate in the manner as described above in the first embodiment. Specifically, when cross-carrier scheduling in which a PDCCH of the TDD serving cell (e.g., the TDD PCell 31 or another TDD SCell) is monitored for DL scheduling of the FDD SCell 32 is configured, the radio terminal 1 may determine the maximum number $M_{DL\_HARQ}$ of DL HARQ processes for the FDD SCell 32 from the second table for FDD-TDD. Further, when self-scheduling in which a PDCCH of the FDD SCell 32 is monitored for DL scheduling of the FDD SCell 32 is configured, the radio terminal 1 may determine $M_{DL\_HARQ}$ of the FDD SCell 32 from the first table.

The radio terminal 1 determines the maximum number $M_{DL\_HARQ}$ of the FDD SCell 32 based on the table selected in accordance with the table selection information. Further, for example, the radio terminal 1 may calculate a partition size (i.e., $N_{IR}$, $N_{cb}$, or $n_{sb}$) in the soft buffer to be allocated to each HARQ process used for each DL transport block received in the FDD SCell 32, by using the determined $M_{DL\_HARQ}$.

Figure 11:
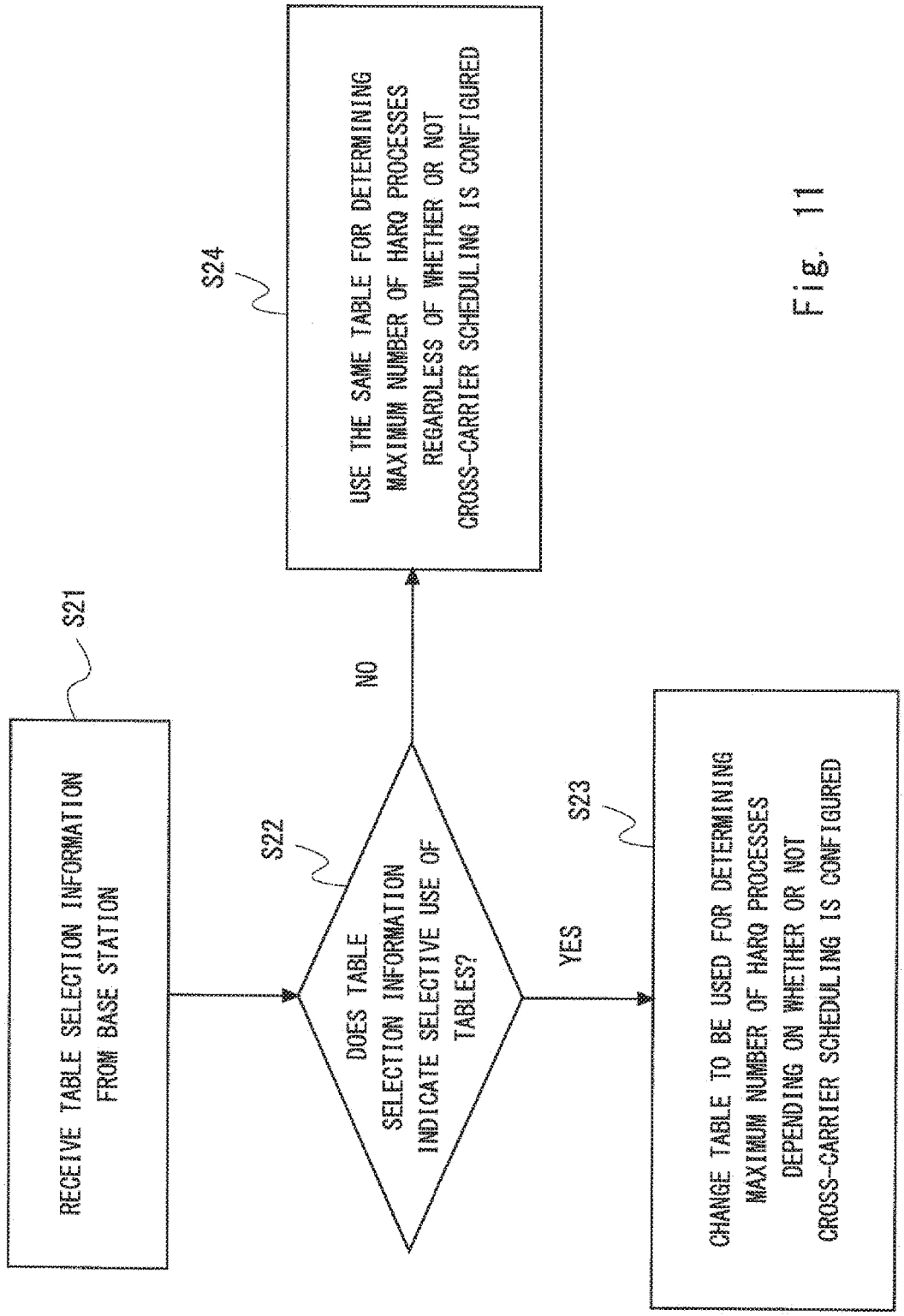
FIG. 11 is a flowchart showing an example of the operation, performed by a radio terminal, for determining the maximum number ($M_{DL\_HARQ}$) of HARQ processes used for DL transmission in the FDD SCell according to a second embodiment.

The flowchart of FIG. 11 shows an example of the operation performed by the radio terminal 1 for determining the maximum number ($M_{DL\_HARQ}$) of HARQ processes used for DL transmission in the FDD SCell 32 according to this embodiment. In step S21, the radio terminal 1 receives the table selection information from the base station 2. The table selection information indicates whether or not there is a need to selectively use the first table (e.g., the above-mentioned Table 2) that defines $M_{DL\_HARQ}$ for TDD and the second table (e.g., the above-mentioned Table 4) that defines $M_{DL\_HARQ}$ for FDD-TDD when the radio terminal determines the maximum number ($M_{DL\_HARQ}$) of DL HRAQ processes for the FDD serving cell (e.g., SCell 32) when the FDD-TDD CA is configured.

In step S22, the radio terminal 1 determines whether or not the table selection information indicates the selective use of the tables. When the table selection information indicates the selective use of the tables (YES in step S22), the radio terminal 1 changes the table to be used for determining $M_{DL\_HARQ}$ for the FDD SCell 32 depending on whether or not cross-carrier scheduling in which a PDCCH of the TDD serving cell (for example, the TDD PCell 31 or another TDD SCell) is monitored for DL scheduling of the FDD SCell 32 is configured. On the other hand, when the table selection information does not indicate the selective use of the tables (NO in step S22), the radio terminal 1 uses the same table (e.g., the above-mentioned Table 4) for determining $M_{DL\_HARQ}$ of the FDD SCell 32 regardless of whether or not the cross-carrier scheduling is configured.

The table selection information may be directly or indirectly transmitted from the base station 2 to the radio terminal 1. For example, the table selection information may be transmitted by dedicated higher-layer signaling between the base station 2 and the radio terminal 1 in the TDD PCell 31 or the FDD SCell 32, such as Radio Resource Control (RRC) signaling.

In another example, the table selection information may be broadcasted to one or more radio terminals 1 in the TDD PCell 31 or the FDD SCell 32 by using system information unique to the TDD PCell 31 or the FDD SCell 32. For example, the table selection information may be a new information element defined in one (e.g., SIB2) of the system information blocks.

Figure 12:
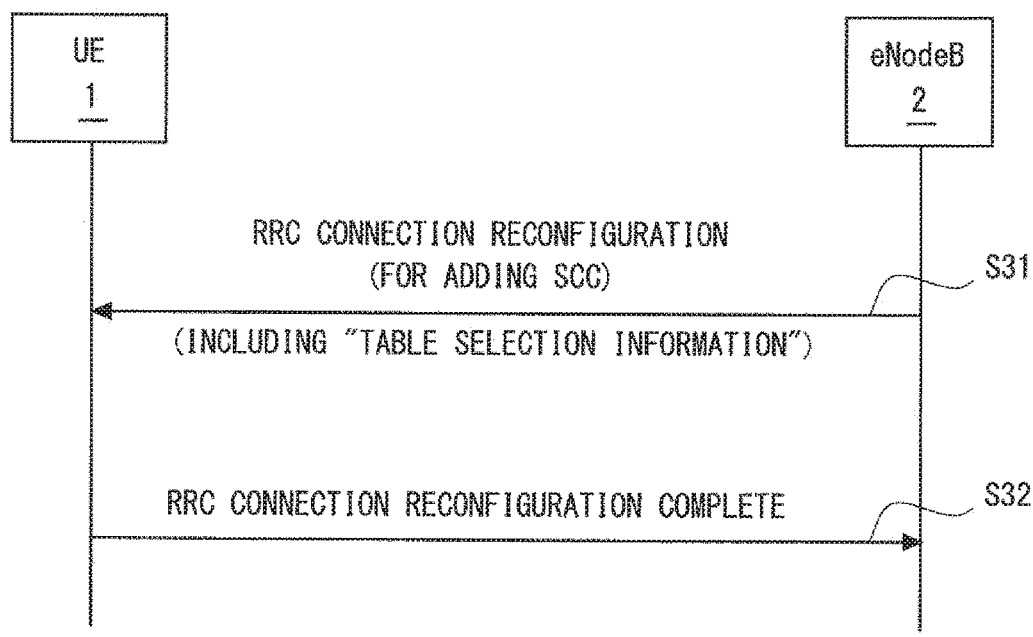
FIG. 12 is a sequence diagram showing an example of a procedure for sending table selection information from a base station to a radio terminal according to the second embodiment.

FIG. 12 is a sequence diagram showing an example of the procedure for transmitting the table selection information. In the example of FIG. 12, the table selection information is transmitted by RRC signaling for adding the FDD SCell 32 to the radio terminal 1 so as to configure the FDD-TDD CA. In step S31, the base station 2 transmits an RRC Connection Reconfiguration message through the RRC connection with the radio terminal 1 in the PCell 31 so as to add the FDD SCell 32 to the radio terminal 1. The RRC Connection Reconfiguration message for adding the SCell 32 includes identification information of the SCell 32, radio resource configuration information about an uplink or a downlink or both of them in the SCell 32, and PUCCH configuration information for reporting HARQ ACK/NACK regarding the SCell 32. The RRC Connection Reconfiguration message also includes the table selection information according to this embodiment. In step S32, the radio terminal 1 configures the SCell 32 based on the RRC Connection Reconfiguration message, and returns an RRC Connection Reconfiguration complete message to the base station 2.

According to this embodiment, the base station 2 can designate the table to be used by the radio terminal 1 to determine the maximum number ($M_{DL\_HARQ}$) of DL HRAQ processes for the FDD serving cell (e.g., the SCell 32) when the FDD-TDD CA is configured. Accordingly, for example, the radio terminal 1 which does not have the table switching function described in the first and second embodiments can be configured to use the same table (e.g., the above-mentioned Table 4) for determining the maximum number $M_{DL\_HARQ}$ of the FDD SCell 32 regardless of whether or not cross-carrier scheduling is configured. On the other hand, the radio terminal 1 having the table switching function as described in the first and second embodiments can be configured to switch between two tables (e.g., the above-mentioned Table 2 and Table 4) to be used for determining the maximum number $M_{DL\_HARQ}$ of the FDD SCell 32 depending on whether or not cross-carrier scheduling is configured.

Third Embodiment

This embodiment illustrates a modified example of the method for determining the maximum number ($M_{DL\_HARQ}$) of HARQ processes used for DL transmission in the FDD serving cell described in the first embodiment. A configuration example of the radio communication system according to this embodiment may be similar to FIG. 7 described above with respect to the first embodiment.

Figure 13:
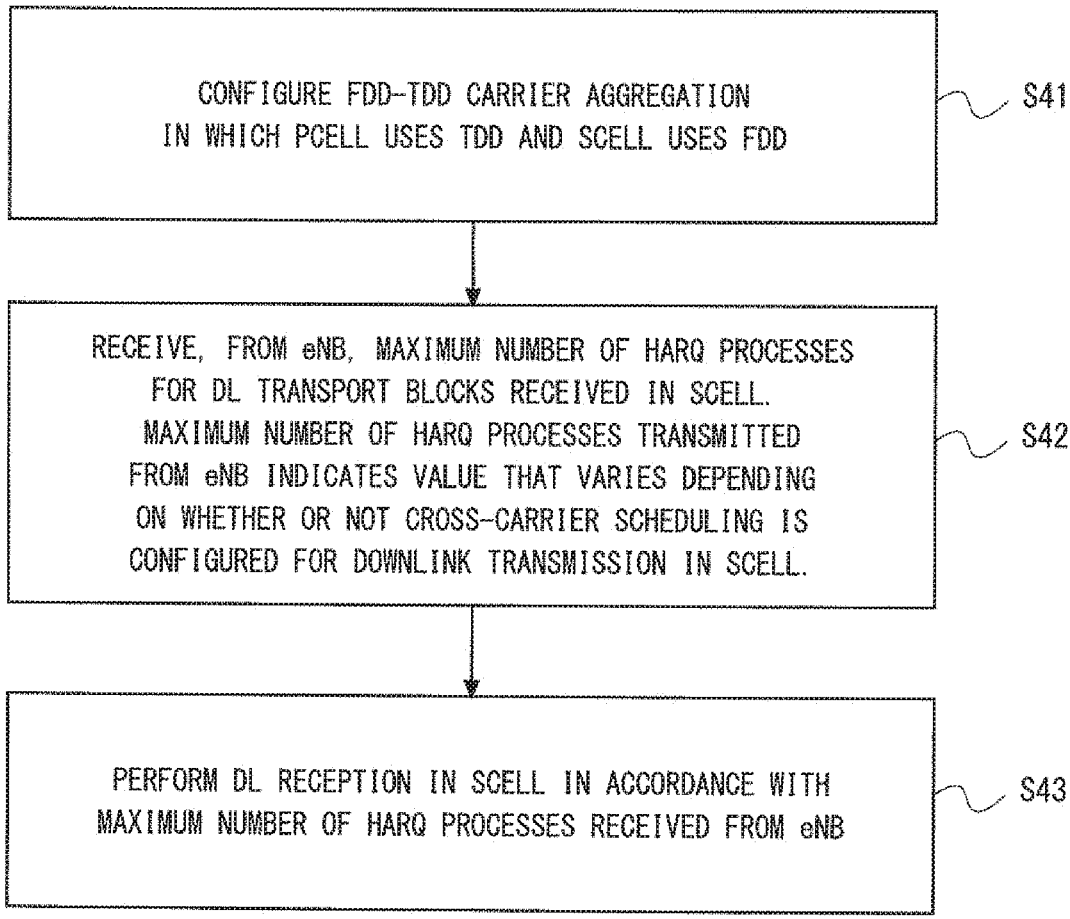
FIG. 13 is a flowchart showing an example of the operation, performed by a radio terminal, for determining the maximum number ($M_{DL\_HARQ}$) of HARQ processes used for DL transmission in the FDD SCell according to a third embodiment.

FIG. 13 shows an example of the operation performed by the radio terminal 1 according to this embodiment. In step S41, the radio terminal 1 configures the FDD-TDD carrier aggregation in which the PCell 31 uses the TDD and the SCell 32 uses the FDD. The radio terminal 1 may be configured by the base station 2 with FDD-TDD CA in which three or more serving cells including the PCell 31 and the SCell 32 and at least one addition SCell are aggregated. At least one addition SCell may be a TDD cell or an FDD cell.

In step S42, the radio terminal 1 receives, from the base station 2, control information indicating the maximum number ($M_{DL\_HARQ}$) of DL HRAQ processes used for the FDD serving cell (e.g., the SCell 32) when the FDD-TDD CA is configured. In step S43, the radio terminal 1 performs DL reception in the SCell 32 in accordance with the maximum number $M_{DL\_HARQ}$ received from the base station 2. For example, the radio terminal 1 may calculate a partition size (i.e., $N_{IR}$, $N_{cb}$, or $n_{sb}$) in the soft buffer to be allocated to each HARQ process used for each DL transport block received in the FDD SCell 32.

In this case, the value of $M_{DL\_HARQ}$ sent from the base station 2 to the radio terminal 1 in step S42 may indicate different values depending on whether or not cross-carrier scheduling in which a PDCCH of the TDD serving cell (e.g., the TDD PCell 31 or another TDD SCell) is monitored for DL transmission in the FDD SCell 32 is configured. Accordingly, different $M_{DL\_HARQ}$ values can be used for the FDD SCell 32 depending on whether or not the cross-carrier scheduling is configured. Therefore, for example, the partition size (i.e., $N_{IR}$, $N_{cb}$, or $n_{sb}$) in the soft buffer to be allocated to each DL HARQ process of the FDD SCell 32 can be varied depending on whether or not the cross-carrier scheduling is configured.

Further, in this embodiment, the base station 2 can explicitly designate the value of $M_{DL\_HARQ}$ of the FDD SCell 32. Accordingly, the base station 2 may set the number of (valid) HARQ processes actually used in the FDD SCell 32 in the value of $M_{DL\_HARQ}$ for the FDD SCell 32 to be sent to the radio terminal 1, instead of setting the theoretical (formal) upper limit value of $M_{DL\_HARQ}$. For example, even if the theoretical (formal) upper limit value of $M_{DL\_HARQ}$ is 4, when the number of valid HARQ processes actually used is 2 because the DL transmission to the radio terminal 1 occurs infrequently, the base station 2 may notify the radio terminal 1 of the value "2" in $M_{DL\_HARQ}$ of the FDD SCell 32, instead of the value "4". Due to this implementation, for example, the radio terminal 1 can increase the partition size per DL HARQ process for the FDD SCell 32 in the soft buffer, and thus can increase the gain by HARQ retransmission.

The control information indicating $M_{DL\_HARQ}$ may be directly or indirectly transmitted to the radio terminal 1 from the base station 2. For example, the control information may be transmitted by dedicated higher-layer signaling between the base station 2 and the radio terminal 1 in the TDD PCell 31 or the FDD SCell 32, such as RRC signaling.

In another example, the control information indicating $M_{DL\_HARQ}$ may be broadcasted to one or more radio terminals 1 in the TDD PCell 31 or the FDD SCell 32 by using system information unique to the TDD PCell 31 or the FDD SCell 32. For example, the control information may be a new information element defined in one (e.g., SIB2) of the system information blocks.

Figure 14:
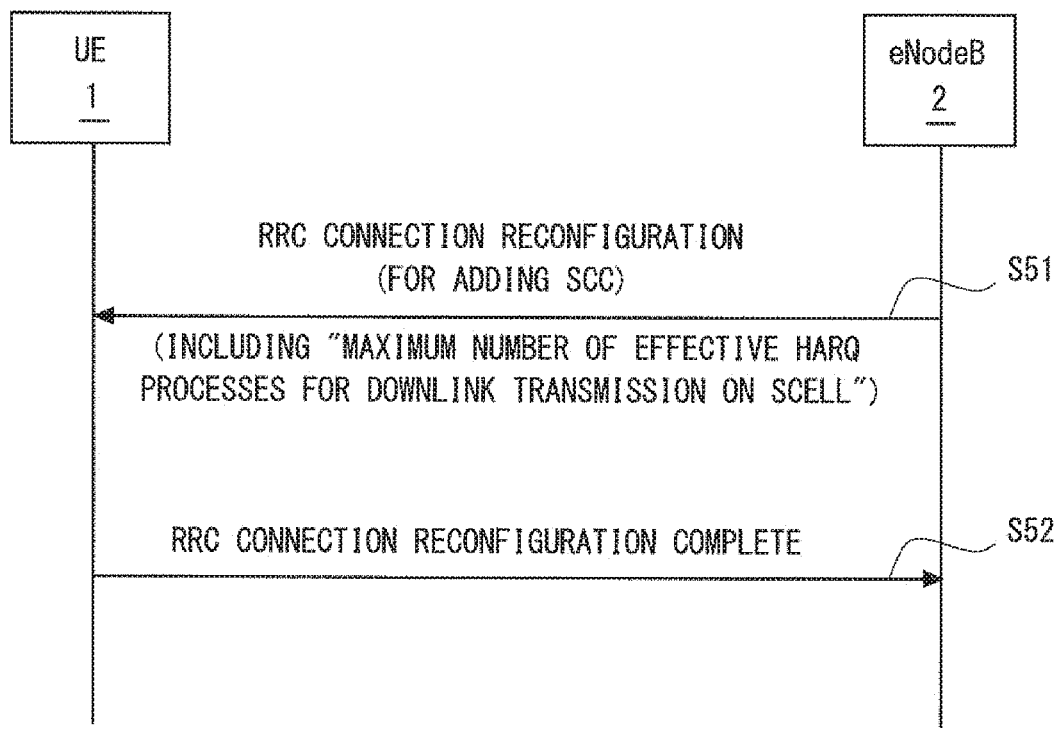
FIG. 14 is a sequence diagram showing an example of a procedure for sending the maximum number ($M_{DL\_HARQ}$) of HARQ processes from a base station to a radio terminal according to the second embodiment.

FIG. 14 is a sequence diagram showing an example of the procedure for transmitting the control information indicating $M_{DL\_HARQ}$. In the example of FIG. 14, the table selection information is transmitted in RRC signaling for adding the FDD SCell 32 to the radio terminal 1 so as to configure the FDD-TDD CA. In step S51, the base station 2 transmits an RRC Connection Reconfiguration message through the RRC connection with the radio terminal 1 in the PCell 31 so as to add the FDD SCell 32 to the radio terminal 1. The RRC Connection Reconfiguration message for adding the SCell 32 includes identification information of the SCell 32, radio resource configuration information about an uplink or a downlink or both of them in the SCell 32, and PUCCH configuration information for reporting HARQ ACK/NACK regarding the SCell 32. The RRC Connection Reconfiguration message also includes the control information indicating $M_{DL\_HARQ}$. In step S52, the radio terminal 1 configures the SCell 32 based on the RRC Connection Reconfiguration message, and returns an RRC Connection Reconfiguration complete message to the base station 2.

Figure 15:
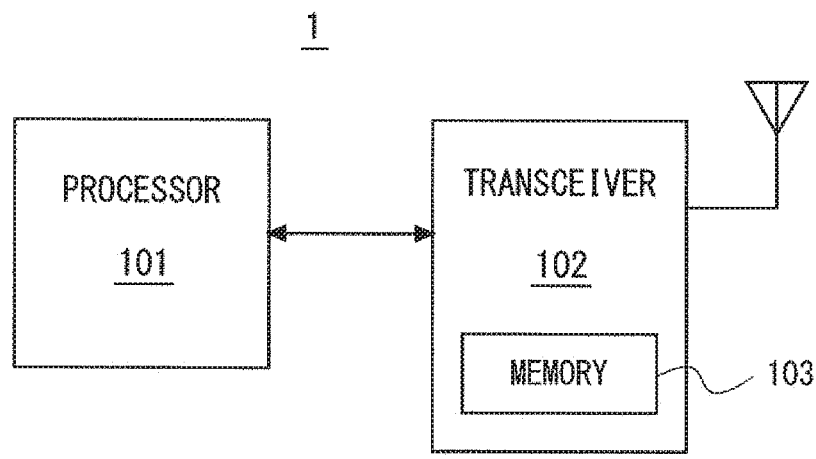
FIG. 15 is a block diagram showing a configuration example of the radio terminal according to the first to third embodiments.

Lastly, configuration examples of the radio terminal 1 and the base station 2 according to the first to third embodiments are described below. FIG. 15 is a block diagram showing a configuration example of the radio terminal 1. In the example of FIG. 15, the radio terminal 1 includes a processor 101 and a transceiver 102. The transceiver 102 includes a memory 103 which is used as a soft buffer to store soft bits for DL HARQ. The transceiver 102 can be configured with the FDD-TDD CA aggregating the TDD PCell 31 and the FDD SCell 32, based on signaling with the base station 2. The transceiver 102 receives DL transport blocks and transmits HARQ ACK/NACKs regarding multiple HARQ processes by using a plurality of partitions obtained by dividing a storage area in the memory 103. The processor 101 determines the maximum number ($M_{DL\_HARQ}$) of HARQ processes used for DL transmission in the FDD SCell 32 as described in the first to third embodiments. The processor 101 may determine the partition size (i.e., $N_{IR}$, $N_{cb}$, or $n_{sb}$) in the soft buffer to be allocated to each DL HARQ process used for each DL transport block received in the FDD SCell 32. The processor 101 may notify the transceiver 102 of the determined size of each partition in the soft buffer in order to execute partitioning of the soft buffer.

Figure 16:
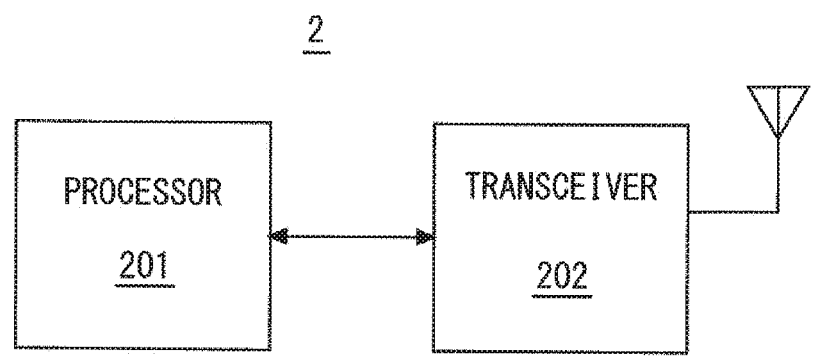
FIG. 16 is a block diagram showing a configuration example of the base station according to the first to third embodiments.

FIG. 16 is a block diagram showing a configuration example of the base station 2. In the example of FIG. 16, the base station 2 includes a processor 201 and a transceiver 202. The transceiver 202 performs signaling with the radio terminal 1, and configures the radio terminal 1 with the FDD-TDD CA in which the TDD PCell 31 and the FDD SCell 32 are aggregated. The transceiver 202 communicates with the radio terminal 1 using the FDD-TDD CA.

The processor 201 determines the maximum number ($M_{DL\_HARQ}$) of DL HARQ processes for the FDD SCell 32 based on whether or not the FDD-TDD CA is configured and whether or not cross-carrier scheduling including monitoring the PDCCH in the TDD serving cell (i.e., the TDD PCell 31 or another TDD SCell) is configured for DL transmission in the FDD SCell 32. In order to cause appropriate operation of multiple DL HARQ processes for the FDD SCell 32, the processor 201 may determine the maximum number $M_{DL\_HARQ}$ of the FDD SCell 32 in the same procedure as the procedure performed by the radio terminal 1 for determining the maximum number $M_{DL\_HARQ}$ of the FDD SCell 32 as described in the first to third embodiments. The determined maximum number ($M_{DL\_HARQ}$) of DL HARQ processes is sent from the processor 201 to the transceiver 202. The transceiver 202 performs transmission and retransmission operations regarding multiple HARQ processes by using the maximum number of DL HARQ processes for the FDD SCell 32 determined by the processor 201.

Other Embodiments

The first to third embodiments are described using specific examples in which the radio terminal 1 configures CA with one base station 2. However, the base station 2 may include a plurality of base stations. Specifically, the radio terminal 1 may be configured with CA in which two or more cells served by a plurality of base stations are aggregated. This type of CA, which uses a plurality of serving cells served by a plurality of base stations, is referred to as inter-site CA or dual connectivity.

The first to third embodiments are described mainly using specific examples regarding systems of 3GPP Release 8 and beyond (i.e., LTE, LTE-A, and LTE-B systems). However, the first to third embodiments may be applied to other communication systems, in particular, radio communication systems that employ TDD-FDD carrier aggregation similar to that of 3GPP Release 8 and beyond.

The operations of the radio terminal 1 and the base station 2 described in the first to third embodiments may be implemented by causing a computer including at least one processor (e.g., a microprocessor, a Micro Processing Unit (MPU), or a Central Processing Unit (CPU)) to execute a program. Specifically, one or more programs containing instructions that cause a computer to perform an algorithm related to the radio terminal 1 or the base station 2 described with reference to FIGS. 8 to 16 and the like may be supplied to the computer.

These programs can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), Compact Disc Read Only Memory (CD-ROM), CD-R, CD-R/W, and semiconductor memories (such as mask ROM, PROM (Programmable ROM), Erasable PROM (EPROM), flash ROM, Random Access Memory (RAM), etc.). These programs may be provided to a computer using any type of transitory computer readable media. Examples of transitory computer readable media include electric signals, optical signals, and electromagnetic waves. Transitory computer readable media can provide the program to a computer via a wired communication line, such as electric wires and optical fibers, or a wireless communication line.

The above-described embodiments are merely examples of the application of the technical ideas obtained by the present inventor. The technical ideas are not limited only to the above-described embodiments and modifications may be made in various ways.

This application is based upon and claims the benefit of priority from Japanese patent application No. 2014-154035, filed on Jul. 29, 2014, the disclosure of which is incorporated herein in its entirety by reference.

REFERENCE SIGNS LIST

1 RADIO TERMINAL
2 BASE STATION
31 PRIMARY CELL (PCell)
32 SECONDARY CELL (SCell)
101 PROCESSOR
102 TRANSCEIVER
201 PROCESSOR
202 TRANSCEIVER

The invention claimed is:
1. A method for performing a downlink hybrid automatic repeat request (HARQ) in a radio terminal which is configured by a base station with a plurality of component carriers including first and second component carriers for carrier aggregation, the method comprising:
configuring the carrier aggregation using a first serving cell operated using the first component carrier and a second serving cell operated using the second component carrier, the first serving cell using a frame structure type 2 for time division duplex (TDD), the second serving cell using a frame structure type 1 for frequency division duplex (FDD);
selecting a maximum number of downlink hybrid automatic repeat request (HARQ) processes used for downlink transport blocks received in the second serving cell from a first table defined for TDD when the radio terminal is configured to monitor a first downlink control channel in the first serving cell for scheduling the second serving cell;
selecting the maximum number from a second table defined for FDD-TDD carrier aggregation when the radio terminal is configured to monitor a second downlink control channel in the second serving cell for scheduling the second serving cell;
receiving downlink transport blocks in the second serving cell in accordance with the determined maximum number of downlink HARQ processes; and receiving, by the radio terminal from the base station, a signal indicating whether or not there is a need to selectively use the first and second tables,
wherein when the signal indicates that there is no need to selectively use the first and second tables, determining the maximum number from the second table, regardless of whether the radio terminal is configured to monitor the first downlink control channel or the second downlink control channel for scheduling the second serving cell.

2. The method according to claim 1, wherein the determining the maximum number includes receiving, from the base station, a signal indicating the maximum number that varies depending on whether or not the radio terminal is configured to monitor the first downlink control channel in the first serving cell for scheduling the second serving cell.

3. The method according to claim 1, further comprising determining, based on the maximum number, a size of a partition in a soft buffer to be allocated to each HARQ process used for a downlink transport block received in the second serving cell.

4. The method according to claim 3, wherein the determining the size of the partition includes determining the size $n_{sb}$ of the partition in accordance with the following formulas (1) to (3):

$$n_{SB} = \min\left(N_{cb}, \left\lfloor \frac{N'_{soft}}{C \cdot N^{DL}_{cells} \cdot K_{MIMO} \cdot \min(M_{DL\_HARQ}, M_{limit})} \right\rfloor\right) \quad (1)$$

$$N_{cb} = \min\left(\left\lfloor \frac{N_{IR}}{C} \right\rfloor, K_w\right) \quad (2)$$

$$N_{IR} = \left\lfloor \frac{N_{soft}}{K_C \cdot K_{MIMO} \cdot \min(M_{DL\_HARQ}, M_{limit})} \right\rfloor \quad (3)$$

where $n_{sb}$ and $N_{cb}$ each represent a partition size per code block in the soft buffer;
$N_{IR}$ represents a partition size per transport block in the soft buffer;
$N'_{soft}$ and $N_{soft}$ each represent a total size of the soft buffer;
C represents the number of code blocks into which a transport block is divided;
$N^{DL}_{cells}$ represents the total number of the plurality of component carriers;
$K_{MIMO}$ represents the number of multiple-input multiple-output (MIMO) layers;
$K_w$ represents the length of a circular buffer provided in the base station and corresponds to a code block length obtained after performing turbo coding, subblock interleaving, and bit collection;
$K_C$ is determined by the following: if $N_{soft}$=35982720, Kc=5, else if $N_{soft}$=3654144 and the radio terminal is capable of supporting no more than a maximum of two spatial layers, Kc=2, else Kc=1;
$M_{limit}$ represents a constant equal to 8; and
$M_{DL\_HARQ}$ represents the maximum number of the HARQ processes used for the downlink transport blocks received in the second serving cell.

5. A radio terminal which is configured by a base station with a plurality of component carriers including first and second component carriers for carrier aggregation, the radio terminal comprising:
a processor configured to:
configure the carrier aggregation using a first serving cell operated using the first component carrier and a second serving cell operated using the second component carrier, the first serving cell using a frame structure type 2 for time division duplex (TDD), the second serving cell using a frame structure type 1 for frequency division duplex (FDD);
select a maximum number of downlink hybrid automatic repeat request (HARD) processes used for downlink transport blocks received in the second serving cell from a first table defined for TDD when the radio terminal is configured to monitor a first downlink control channel in the first serving cell for scheduling the second serving cell;
select the maximum number from a second table defined for FDD-TDD carrier aggregation when the radio terminal is configured to monitor a second downlink control channel in the second serving cell for scheduling the second serving cell;
receive downlink transport blocks in the second serving cell in accordance with the determined maximum number of downlink HARQ processes; and
receive, from the base station, a signal indicating whether or not there is a need to selectively use the first and second tables,
wherein when the signal indicates that there is no need to selectively use the first and second tables, determine the maximum number from the second table, regardless of whether the radio terminal is configured to monitor the first downlink control channel or the second downlink control channel for scheduling the second serving cell.

6. The radio terminal according to claim 5, wherein the processor is configured to receive, from the base station, a signal indicating the maximum number that varies depending on whether or not the radio terminal is configured to monitor the first downlink control channel in the first serving cell for scheduling the second serving cell, in order to determine the maximum number.

7. The radio terminal according to claim 5, further comprising a memory used as a soft buffer configured to store soft bits for a downlink hybrid automatic repeat request (HARQ),
wherein the processor is further configured to determine a size of a partition in the soft buffer to be allocated to each HARQ process used for a downlink transport block received in the second serving cell.

8. The radio terminal according to claim 7, wherein the processor is configured to determine the size $n_{sb}$ of the partition in accordance with the following formulas (1) to (3):

$$n_{SB} = \min\left(N_{cb}, \left\lfloor \frac{N'_{soft}}{C \cdot N^{DL}_{cells} \cdot K_{MIMO} \cdot \min(M_{DL\_HARQ}, M_{limit})} \right\rfloor\right) \quad (1)$$

$$N_{cb} = \min\left(\left\lfloor \frac{N_{IR}}{C} \right\rfloor, K_w\right) \quad (2)$$

$$N_{IR} = \left\lfloor \frac{N_{soft}}{K_C \cdot K_{MIMO} \cdot \min(M_{DL\_HARQ}, M_{limit})} \right\rfloor \quad (3)$$

where $n_{sb}$ and $N_{cb}$ each represent a partition size per code block in the soft buffer;
$N_{IR}$ represents a partition size per transport block in the soft buffer;
$N'_{soft}$ and $N_{soft}$ each represent a total size of the soft buffer;
C represents the number of code blocks into which a transport block is divided;

$N_{cells}^{DL}$ represents the total number of the plurality of component carriers;

$K_{MIMO}$ represents the number of multiple-input multiple-output (MIMO) layers;

$K_w$ represents the length of a circular buffer provided in the base station and corresponds to a code block length obtained after performing turbo coding, subblock interleaving, and bit collection;

$K_C$ is determined by the following: if $N_{soft}$=35982720, Kc=5, else if $N_{soft}$=3654144 and the radio terminal is capable of supporting no more than a maximum of two spatial layers, Kc=2, else Kc=1;

$M_{limit}$ represents a constant equal to 8; and $M_{DL\_HARQ}$ represents the maximum number of the HARQ processes used for the downlink transport blocks received in the second serving cell.

9. A method performed by a base station that allocates a plurality of component carriers including first and second component carriers to a radio terminal for carrier aggregation, the method comprising:

configuring the carrier aggregation using a first serving cell operated using the first component carrier and a second serving cell operated using the second component carrier, the first serving cell using a frame structure type 2 for time division duplex (TDD), the second serving cell using a frame structure type 1 for frequency division duplex (FDD);

selecting a maximum number of downlink hybrid automatic repeat request (HARQ) processes used for downlink transport blocks received in the second serving cell from a first table defined for TDD when the radio terminal is configured to monitor a first downlink control channel in the first serving cell for scheduling the second serving cell;

selecting the maximum number from a second table defined for FDD-TDD carrier aggregation when the radio terminal is configured to monitor a second downlink control channel in the second serving cell for scheduling the second serving cell;

transmitting downlink transport blocks by using multiple HARQ processes in accordance with the maximum number; and transmitting, to the radio terminal, a signal indicating whether or not there is a need to selectively use the first and second tables, wherein the signal causes the radio terminal to, when the signal indicates that there is no need to selectively use the first and second tables, determine the maximum number from the second table, regardless of whether the radio terminal is configured to monitor the first downlink control channel or the second downlink control channel for scheduling the second serving cell.

* * * * *